(12) United States Patent
Shats et al.

(10) Patent No.: US 9,699,263 B1
(45) Date of Patent: Jul. 4, 2017

(54) AUTOMATIC READ AND WRITE ACCELERATION OF DATA ACCESSED BY VIRTUAL MACHINES

(71) Applicant: SanDisk Enterprise IP LLC, Milpitas, CA (US)

(72) Inventors: Serge Shats, Palo Alto, CA (US); Alexei Jelvis, Menlo Park, CA (US); Muthukumar Ratty, Sunnyvale, CA (US); Eugene Vignanker, Redwood Shores, CA (US)

(73) Assignee: SANDISK TECHNOLOGIES LLC., Plano, TX (US)

( * ) Notice: Subject to any disclaimer, the term of this patent is extended or adjusted under 35 U.S.C. 154(b) by 393 days.

(21) Appl. No.: 13/831,677

(22) Filed: Mar. 15, 2013

Related U.S. Application Data

(60) Provisional application No. 61/684,646, filed on Aug. 17, 2012.

(51) Int. Cl.
*G06F 15/167* (2006.01)
*H04L 29/08* (2006.01)
(Continued)

(52) U.S. Cl.
CPC .......... *H04L 67/2842* (2013.01); *G06F 12/08* (2013.01); *G06F 12/0804* (2013.01); *H04L 67/2852* (2013.01); *G06F 17/30902* (2013.01)

(58) Field of Classification Search
CPC .......... G06F 17/30902; G06F 12/0804; G06F 12/0808; G06F 12/0859; G06F 12/0866;
(Continued)

(56) References Cited

U.S. PATENT DOCUMENTS

| 4,173,737 A | 11/1979 | Skerlos et al. |
| 4,888,750 A | 12/1989 | Kryder et al. |

(Continued)

FOREIGN PATENT DOCUMENTS

| EP | 1 299 800 | 4/2003 |
| EP | 1465203 A1 | 10/2004 |

(Continued)

OTHER PUBLICATIONS

International Search Report and Written Opinion dated Jul. 25, 2014, received in International Patent Application No. PCT/US2014/029453, which corresponds to U.S. Appl. No. 13/963,444, 9 pages (Frayer).

(Continued)

*Primary Examiner* — Joseph E Avellino
*Assistant Examiner* — Patrick Ngankam
(74) *Attorney, Agent, or Firm* — Morgan, Lewis & Bockius LLP

(57) ABSTRACT

The various implementations described herein include methods and systems for automatic management of data access acceleration in a computer system executing a plurality of clients. The method includes: receiving data access commands from two or more clients to access data in objects identified by the data access commands; and processing the data access commands to update access history information for portions of the objects identified by the data access commands. The method further includes: in accordance with the access history information, automatically identifying and marking for acceleration the portions of the objects identified by the data access commands that satisfy an access based data acceleration policy; and accelerating the object portions marked for acceleration, including accelerating data writes and data reads of the object portions to and from the (Continued)

persistent cache, where the persistent cache is shared by the two or more clients.

25 Claims, 9 Drawing Sheets

(51) Int. Cl.
*G06F 12/08* (2016.01)
*G06F 12/0804* (2016.01)
*G06F 17/30* (2006.01)

(58) Field of Classification Search
CPC ... G06F 12/0897; H04L 67/28; H04L 67/288; H04L 67/2842; H04L 67/2852; H03M 7/3088
USPC ................................ 709/213; 711/135, 138
See application file for complete search history.

(56) References Cited

U.S. PATENT DOCUMENTS

| | | | |
|---|---|---|---|
| 4,916,652 | A | 4/1990 | Schwarz et al. |
| 5,129,089 | A | 7/1992 | Nielsen |
| 5,270,979 | A | 12/1993 | Harari et al. |
| 5,329,491 | A | 7/1994 | Brown et al. |
| 5,381,528 | A | 1/1995 | Brunelle |
| 5,404,485 | A | 4/1995 | Ban |
| 5,488,702 | A | 1/1996 | Byers et al. |
| 5,519,847 | A | 5/1996 | Fandrich et al. |
| 5,530,705 | A | 6/1996 | Malone, Sr. |
| 5,537,555 | A | 7/1996 | Landry et al. |
| 5,551,003 | A | 8/1996 | Mattson et al. |
| 5,636,342 | A | 6/1997 | Jeffries |
| 5,657,332 | A | 8/1997 | Auclair et al. |
| 5,666,114 | A | 9/1997 | Brodie et al. |
| 5,708,849 | A | 1/1998 | Coke et al. |
| 5,765,185 | A | 6/1998 | Lambrache et al. |
| 5,890,193 | A | 3/1999 | Chevallier |
| 5,930,188 | A | 7/1999 | Roohparvar |
| 5,936,884 | A | 8/1999 | Hasbun et al. |
| 5,943,692 | A | 8/1999 | Marberg et al. |
| 5,946,714 | A | 8/1999 | Miyauchi |
| 5,982,664 | A | 11/1999 | Watanabe |
| 6,000,006 | A | 12/1999 | Bruce et al. |
| 6,006,345 | A | 12/1999 | Berry, Jr. |
| 6,016,560 | A | 1/2000 | Wada et al. |
| 6,018,304 | A | 1/2000 | Bessios |
| 6,044,472 | A | 3/2000 | Crohas |
| 6,070,074 | A | 5/2000 | Perahia et al. |
| 6,104,304 | A | 8/2000 | Clark et al. |
| 6,119,250 | A | 9/2000 | Nishimura et al. |
| 6,138,261 | A | 10/2000 | Wilcoxson et al. |
| 6,182,264 | B1 | 1/2001 | Ott |
| 6,192,092 | B1 | 2/2001 | Dizon et al. |
| 6,260,120 | B1 | 7/2001 | Blumenau et al. |
| 6,295,592 | B1 | 9/2001 | Jeddeloh |
| 6,311,263 | B1 | 10/2001 | Barlow et al. |
| 6,408,394 | B1 | 6/2002 | Vander Kamp et al. |
| 6,412,042 | B1 | 6/2002 | Paterson et al. |
| 6,442,076 | B1 | 8/2002 | Roohparvar |
| 6,449,625 | B1 | 9/2002 | Wang |
| 6,484,224 | B1 | 11/2002 | Robins et al. |
| 6,516,437 | B1 | 2/2003 | Van Stralen et al. |
| 6,564,285 | B1 | 5/2003 | Mills et al. |
| 6,647,387 | B1 | 11/2003 | McKean et al. |
| 6,675,258 | B1 | 1/2004 | Bramhall et al. |
| 6,678,788 | B1 | 1/2004 | O'Connell |
| 6,728,879 | B1 | 4/2004 | Atkinson |
| 6,757,768 | B1 | 6/2004 | Potter et al. |
| 6,775,792 | B2 | 8/2004 | Ulrich et al. |
| 6,810,440 | B2 | 10/2004 | Micalizzi, Jr. et al. |
| 6,836,808 | B2 | 12/2004 | Bunce et al. |
| 6,836,815 | B1 | 12/2004 | Purcell et al. |
| 6,842,436 | B2 | 1/2005 | Moeller |
| 6,865,650 | B1 * | 3/2005 | Morley ............... G06F 11/1076 711/112 |
| 6,871,257 | B2 | 3/2005 | Conley et al. |
| 6,895,464 | B2 | 5/2005 | Chow et al. |
| 6,934,755 | B1 | 8/2005 | Saulpaugh et al. |
| 6,966,006 | B2 | 11/2005 | Pacheco et al. |
| 6,978,343 | B1 | 12/2005 | Ichiriu |
| 6,980,985 | B1 | 12/2005 | Amer-Yahia et al. |
| 6,981,205 | B2 | 12/2005 | Fukushima et al. |
| 6,988,171 | B2 | 1/2006 | Beardsley et al. |
| 7,020,017 | B2 | 3/2006 | Chen et al. |
| 7,024,514 | B2 | 4/2006 | Mukaida et al. |
| 7,028,165 | B2 | 4/2006 | Roth et al. |
| 7,032,123 | B2 | 4/2006 | Kane et al. |
| 7,043,505 | B1 | 5/2006 | Teague et al. |
| 7,076,598 | B2 | 7/2006 | Wang |
| 7,100,002 | B2 | 8/2006 | Shrader |
| 7,102,860 | B2 | 9/2006 | Wenzel |
| 7,111,293 | B1 | 9/2006 | Hersh et al. |
| 7,126,873 | B2 | 10/2006 | See et al. |
| 7,133,282 | B2 | 11/2006 | Sone |
| 7,155,579 | B1 | 12/2006 | Neils et al. |
| 7,162,678 | B2 | 1/2007 | Saliba |
| 7,173,852 | B2 | 2/2007 | Gorobets et al. |
| 7,184,446 | B2 | 2/2007 | Rashid et al. |
| 7,212,440 | B2 | 5/2007 | Gorobets |
| 7,269,755 | B2 | 9/2007 | Moshayedi et al. |
| 7,275,170 | B2 | 9/2007 | Suzuki |
| 7,295,479 | B2 | 11/2007 | Yoon et al. |
| 7,328,377 | B1 | 2/2008 | Lewis et al. |
| 7,426,633 | B2 | 9/2008 | Thompson et al. |
| 7,486,561 | B2 | 2/2009 | Mokhlesi |
| 7,516,292 | B2 | 4/2009 | Kimura et al. |
| 7,523,157 | B2 | 4/2009 | Aguilar, Jr. et al. |
| 7,527,466 | B2 | 5/2009 | Simmons |
| 7,529,466 | B2 | 5/2009 | Takahashi |
| 7,533,214 | B2 | 5/2009 | Aasheim et al. |
| 7,546,478 | B2 | 6/2009 | Kubo et al. |
| 7,566,987 | B2 | 7/2009 | Black et al. |
| 7,571,277 | B2 | 8/2009 | Mizushima |
| 7,574,554 | B2 | 8/2009 | Tanaka et al. |
| 7,596,643 | B2 | 9/2009 | Merry, Jr. et al. |
| 7,669,003 | B2 | 2/2010 | Sinclair et al. |
| 7,681,106 | B2 | 3/2010 | Jarrar et al. |
| 7,685,494 | B1 | 3/2010 | Varnica et al. |
| 7,707,481 | B2 | 4/2010 | Kirschner et al. |
| 7,761,655 | B2 | 7/2010 | Mizushima et al. |
| 7,765,454 | B2 | 7/2010 | Passint |
| 7,774,390 | B2 | 8/2010 | Shin |
| 7,809,836 | B2 | 10/2010 | Mihm et al. |
| 7,840,762 | B2 | 11/2010 | Oh et al. |
| 7,870,326 | B2 | 1/2011 | Shin et al. |
| 7,890,818 | B2 | 2/2011 | Kong et al. |
| 7,913,022 | B1 | 3/2011 | Baxter |
| 7,925,960 | B2 | 4/2011 | Ho et al. |
| 7,934,052 | B2 | 4/2011 | Prins et al. |
| 7,945,825 | B2 | 5/2011 | Cohen et al. |
| 7,954,041 | B2 | 5/2011 | Hong et al. |
| 7,971,112 | B2 | 6/2011 | Murata |
| 7,974,368 | B2 | 7/2011 | Shieh et al. |
| 7,978,516 | B2 | 7/2011 | Olbrich et al. |
| 7,996,642 | B1 | 8/2011 | Smith |
| 8,006,161 | B2 | 8/2011 | Lestable et al. |
| 8,032,724 | B1 | 10/2011 | Smith |
| 8,041,884 | B2 | 10/2011 | Chang |
| 8,042,011 | B2 | 10/2011 | Nicolaidis et al. |
| 8,069,390 | B2 | 11/2011 | Lin |
| 8,190,967 | B2 | 5/2012 | Hong et al. |
| 8,250,380 | B2 | 8/2012 | Guyot |
| 8,254,181 | B2 | 8/2012 | Hwang et al. |
| 8,259,506 | B1 | 9/2012 | Sommer et al. |
| 8,261,020 | B2 | 9/2012 | Krishnaprasad et al. |
| 8,312,349 | B2 | 11/2012 | Reche et al. |
| 8,385,117 | B2 | 2/2013 | Sakurada et al. |
| 8,412,985 | B1 | 4/2013 | Bowers et al. |
| 8,429,436 | B2 | 4/2013 | Fillingim et al. |
| 8,438,459 | B2 | 5/2013 | Cho et al. |
| 8,453,022 | B2 | 5/2013 | Katz |
| 8,473,680 | B1 | 6/2013 | Pruthi |

(56) References Cited

U.S. PATENT DOCUMENTS

| | | |
|---|---|---|
| 8,510,499 B1 | 8/2013 | Banerjee |
| 8,531,888 B2 | 9/2013 | Chilappagari et al. |
| 8,554,984 B2 | 10/2013 | Yano et al. |
| 8,627,117 B2 | 1/2014 | Johnston |
| 8,634,248 B1 | 1/2014 | Sprouse et al. |
| 8,694,854 B1 | 4/2014 | Dar et al. |
| 8,700,842 B2 | 4/2014 | Dinker |
| 8,724,789 B2 | 5/2014 | Altberg et al. |
| 8,775,741 B1 | 7/2014 | de la Iglesia |
| 8,788,778 B1 | 7/2014 | Boyle |
| 8,832,384 B1 | 9/2014 | de la Iglesia |
| 8,849,825 B1 | 9/2014 | McHugh et al. |
| 8,874,992 B2 | 10/2014 | Desireddi et al. |
| 8,885,434 B2 | 11/2014 | Kumar |
| 8,898,373 B1 | 11/2014 | Kang et al. |
| 8,909,894 B1 | 12/2014 | Singh et al. |
| 8,910,030 B2 | 12/2014 | Goel |
| 8,923,066 B1 | 12/2014 | Subramanian et al. |
| 8,928,681 B1 | 1/2015 | Edmondson et al. |
| 9,002,805 B1 | 4/2015 | Barber et al. |
| 9,043,517 B1 | 5/2015 | Sprouse et al. |
| 9,052,942 B1 | 6/2015 | Barber et al. |
| 9,063,946 B1 | 6/2015 | Barber et al. |
| 9,110,843 B2 | 8/2015 | Chiu et al. |
| 9,128,690 B2 | 9/2015 | Lotzenburger et al. |
| 9,329,789 B1 | 5/2016 | Chu et al. |
| 9,355,060 B1 | 5/2016 | Barber et al. |
| 9,417,917 B1 | 8/2016 | Barber et al. |
| 2001/0026949 A1 | 10/2001 | Ogawa et al. |
| 2001/0050824 A1 | 12/2001 | Buch |
| 2002/0024846 A1 | 2/2002 | Kawahara et al. |
| 2002/0032891 A1 | 3/2002 | Yada et al. |
| 2002/0036515 A1 | 3/2002 | Eldridge et al. |
| 2002/0083299 A1 | 6/2002 | Van Huben et al. |
| 2002/0099904 A1 | 7/2002 | Conley |
| 2002/0116651 A1 | 8/2002 | Beckert et al. |
| 2002/0122334 A1 | 9/2002 | Lee et al. |
| 2002/0152305 A1 | 10/2002 | Jackson et al. |
| 2002/0162075 A1 | 10/2002 | Talagala et al. |
| 2002/0165896 A1 | 11/2002 | Kim |
| 2003/0041299 A1 | 2/2003 | Kanazawa et al. |
| 2003/0043829 A1 | 3/2003 | Rashid et al. |
| 2003/0079172 A1 | 4/2003 | Yamagishi et al. |
| 2003/0088805 A1 | 5/2003 | Majni et al. |
| 2003/0093628 A1 | 5/2003 | Matter et al. |
| 2003/0163594 A1 | 8/2003 | Aasheim et al. |
| 2003/0163629 A1 | 8/2003 | Conley et al. |
| 2003/0188045 A1 | 10/2003 | Jacobson |
| 2003/0189856 A1 | 10/2003 | Cho et al. |
| 2003/0198100 A1 | 10/2003 | Matsushita et al. |
| 2003/0204341 A1 | 10/2003 | Guliani et al. |
| 2003/0212719 A1 | 11/2003 | Yasuda et al. |
| 2003/0225961 A1 | 12/2003 | Chow et al. |
| 2004/0024957 A1 | 2/2004 | Lin et al. |
| 2004/0024963 A1 | 2/2004 | Talagala et al. |
| 2004/0057575 A1 | 3/2004 | Zhang et al. |
| 2004/0062157 A1 | 4/2004 | Kawabe |
| 2004/0073829 A1 | 4/2004 | Olarig |
| 2004/0085849 A1 | 5/2004 | Myoung et al. |
| 2004/0114265 A1 | 6/2004 | Talbert |
| 2004/0143710 A1 | 7/2004 | Walmsley |
| 2004/0148561 A1 | 7/2004 | Shen et al. |
| 2004/0153902 A1 | 8/2004 | Machado et al. |
| 2004/0158775 A1 | 8/2004 | Shibuya et al. |
| 2004/0167898 A1 | 8/2004 | Margolus et al. |
| 2004/0181734 A1 | 9/2004 | Saliba |
| 2004/0199714 A1 | 10/2004 | Estakhri et al. |
| 2004/0210706 A1 | 10/2004 | In et al. |
| 2004/0237018 A1 | 11/2004 | Riley |
| 2005/0060456 A1 | 3/2005 | Shrader et al. |
| 2005/0060501 A1 | 3/2005 | Shrader |
| 2005/0073884 A1 | 4/2005 | Gonzalez et al. |
| 2005/0108588 A1 | 5/2005 | Yuan |
| 2005/0114587 A1 | 5/2005 | Chou et al. |
| 2005/0138442 A1 | 6/2005 | Keller, Jr. et al. |
| 2005/0144358 A1 | 6/2005 | Conley et al. |
| 2005/0144361 A1 | 6/2005 | Gonzalez et al. |
| 2005/0144367 A1 | 6/2005 | Sinclair |
| 2005/0144516 A1 | 6/2005 | Gonzalez et al. |
| 2005/0154825 A1 | 7/2005 | Fair |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0210348 A1 | 9/2005 | Totsuka |
| 2005/0231765 A1 | 10/2005 | So et al. |
| 2005/0249013 A1 | 11/2005 | Janzen et al. |
| 2005/0251617 A1 | 11/2005 | Sinclair et al. |
| 2005/0257120 A1 | 11/2005 | Gorobets et al. |
| 2005/0273560 A1 | 12/2005 | Hulbert et al. |
| 2005/0281088 A1 | 12/2005 | Ishidoshiro et al. |
| 2005/0289314 A1 | 12/2005 | Adusumilli et al. |
| 2006/0010174 A1 | 1/2006 | Nguyen et al. |
| 2006/0039196 A1 | 2/2006 | Gorobets et al. |
| 2006/0039227 A1 | 2/2006 | Lai et al. |
| 2006/0053246 A1 | 3/2006 | Lee |
| 2006/0062054 A1 | 3/2006 | Hamilton et al. |
| 2006/0069932 A1 | 3/2006 | Oshikawa et al. |
| 2006/0085671 A1 | 4/2006 | Majni et al. |
| 2006/0087893 A1 | 4/2006 | Nishihara et al. |
| 2006/0103480 A1 | 5/2006 | Moon et al. |
| 2006/0107181 A1 | 5/2006 | Dave et al. |
| 2006/0136570 A1 | 6/2006 | Pandya |
| 2006/0136655 A1 | 6/2006 | Gorobets et al. |
| 2006/0136681 A1 | 6/2006 | Jain et al. |
| 2006/0156177 A1 | 7/2006 | Kottapalli et al. |
| 2006/0184738 A1 | 8/2006 | Bridges et al. |
| 2006/0195650 A1 | 8/2006 | Su et al. |
| 2006/0209592 A1 | 9/2006 | Li et al. |
| 2006/0224841 A1 | 10/2006 | Terai et al. |
| 2006/0244049 A1 | 11/2006 | Yaoi et al. |
| 2006/0259528 A1 | 11/2006 | Dussud et al. |
| 2006/0265568 A1 | 11/2006 | Burton |
| 2006/0291301 A1 | 12/2006 | Ziegelmayer |
| 2007/0011413 A1 | 1/2007 | Nonaka et al. |
| 2007/0033376 A1 | 2/2007 | Sinclair et al. |
| 2007/0058446 A1 | 3/2007 | Hwang et al. |
| 2007/0061597 A1 | 3/2007 | Holtzman et al. |
| 2007/0076479 A1 | 4/2007 | Kim et al. |
| 2007/0081408 A1 | 4/2007 | Kwon et al. |
| 2007/0083697 A1 | 4/2007 | Birrell et al. |
| 2007/0088716 A1 | 4/2007 | Brumme et al. |
| 2007/0091677 A1 | 4/2007 | Lasser et al. |
| 2007/0101096 A1 | 5/2007 | Gorobets |
| 2007/0106679 A1 | 5/2007 | Perrin et al. |
| 2007/0113019 A1 | 5/2007 | Beukema et al. |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0156842 A1 | 7/2007 | Vermeulen et al. |
| 2007/0157064 A1 | 7/2007 | Falik et al. |
| 2007/0174579 A1 | 7/2007 | Shin |
| 2007/0180188 A1 | 8/2007 | Fujibayashi et al. |
| 2007/0180346 A1 | 8/2007 | Murin |
| 2007/0191993 A1 | 8/2007 | Wyatt |
| 2007/0201274 A1 | 8/2007 | Yu et al. |
| 2007/0204128 A1 | 8/2007 | Lee et al. |
| 2007/0208901 A1 | 9/2007 | Purcell et al. |
| 2007/0234143 A1 | 10/2007 | Kim |
| 2007/0245061 A1 | 10/2007 | Harriman |
| 2007/0245099 A1 | 10/2007 | Gray et al. |
| 2007/0263442 A1 | 11/2007 | Cornwell et al. |
| 2007/0268754 A1 | 11/2007 | Lee et al. |
| 2007/0277036 A1 | 11/2007 | Chamberlain et al. |
| 2007/0279988 A1 | 12/2007 | Nguyen |
| 2007/0291556 A1 | 12/2007 | Kamei |
| 2007/0294496 A1 | 12/2007 | Goss et al. |
| 2007/0300130 A1 | 12/2007 | Gorobets |
| 2008/0013390 A1 | 1/2008 | Zipprich-Rasch |
| 2008/0019182 A1 | 1/2008 | Yanagidaira et al. |
| 2008/0022163 A1 | 1/2008 | Tanaka et al. |
| 2008/0028275 A1 | 1/2008 | Chen et al. |
| 2008/0043871 A1 | 2/2008 | Latouche et al. |
| 2008/0052446 A1 | 2/2008 | Lasser et al. |

(56) References Cited

U.S. PATENT DOCUMENTS

| | | |
|---|---|---|
| 2008/0056005 A1 | 3/2008 | Aritome |
| 2008/0059602 A1 | 3/2008 | Matsuda et al. |
| 2008/0071971 A1 | 3/2008 | Kim et al. |
| 2008/0077841 A1 | 3/2008 | Gonzalez et al. |
| 2008/0077937 A1 | 3/2008 | Shin et al. |
| 2008/0086677 A1 | 4/2008 | Yang et al. |
| 2008/0112226 A1 | 5/2008 | Mokhlesi |
| 2008/0141043 A1 | 6/2008 | Flynn et al. |
| 2008/0144371 A1 | 6/2008 | Yeh et al. |
| 2008/0147714 A1 | 6/2008 | Breternitz et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168191 A1 | 7/2008 | Biran et al. |
| 2008/0168319 A1 | 7/2008 | Lee et al. |
| 2008/0170460 A1 | 7/2008 | Oh et al. |
| 2008/0180084 A1 | 7/2008 | Dougherty et al. |
| 2008/0209282 A1 | 8/2008 | Lee et al. |
| 2008/0229000 A1 | 9/2008 | Kim |
| 2008/0229003 A1 | 9/2008 | Mizushima et al. |
| 2008/0229176 A1 | 9/2008 | Arnez et al. |
| 2008/0270680 A1 | 10/2008 | Chang |
| 2008/0282128 A1 | 11/2008 | Lee et al. |
| 2008/0285351 A1 | 11/2008 | Shlick et al. |
| 2008/0313132 A1 | 12/2008 | Hao et al. |
| 2008/0320110 A1 | 12/2008 | Pathak |
| 2009/0003046 A1 | 1/2009 | Nirschl et al. |
| 2009/0003058 A1 | 1/2009 | Kang |
| 2009/0019216 A1 | 1/2009 | Yamada et al. |
| 2009/0031083 A1* | 1/2009 | Willis ................ G06F 11/1441 711/135 |
| 2009/0037652 A1 | 2/2009 | Yu et al. |
| 2009/0070608 A1 | 3/2009 | Kobayashi |
| 2009/0116283 A1 | 5/2009 | Ha et al. |
| 2009/0125671 A1 | 5/2009 | Flynn et al. |
| 2009/0144598 A1 | 6/2009 | Yoon et al. |
| 2009/0158288 A1 | 6/2009 | Fulton et al. |
| 2009/0168525 A1 | 7/2009 | Olbrich et al. |
| 2009/0172258 A1 | 7/2009 | Olbrich et al. |
| 2009/0172259 A1 | 7/2009 | Prins et al. |
| 2009/0172260 A1 | 7/2009 | Olbrich et al. |
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0193058 A1 | 7/2009 | Reid |
| 2009/0204823 A1 | 8/2009 | Giordano et al. |
| 2009/0207660 A1 | 8/2009 | Hwang et al. |
| 2009/0213649 A1 | 8/2009 | Takahashi et al. |
| 2009/0222708 A1 | 9/2009 | Yamaga |
| 2009/0228761 A1 | 9/2009 | Perlmutter et al. |
| 2009/0235128 A1 | 9/2009 | Eun et al. |
| 2009/0249160 A1 | 10/2009 | Gao et al. |
| 2009/0251962 A1 | 10/2009 | Yun et al. |
| 2009/0268521 A1 | 10/2009 | Ueno et al. |
| 2009/0292972 A1 | 11/2009 | Seol et al. |
| 2009/0296466 A1 | 12/2009 | Kim et al. |
| 2009/0296486 A1 | 12/2009 | Kim et al. |
| 2009/0310422 A1 | 12/2009 | Edahiro et al. |
| 2009/0319864 A1 | 12/2009 | Shrader |
| 2010/0002506 A1 | 1/2010 | Cho et al. |
| 2010/0008175 A1 | 1/2010 | Sweere et al. |
| 2010/0011261 A1 | 1/2010 | Cagno et al. |
| 2010/0020620 A1 | 1/2010 | Kim et al. |
| 2010/0037012 A1 | 2/2010 | Yano et al. |
| 2010/0054034 A1 | 3/2010 | Furuta et al. |
| 2010/0061151 A1 | 3/2010 | Miwa et al. |
| 2010/0091535 A1 | 4/2010 | Sommer et al. |
| 2010/0103737 A1 | 4/2010 | Park |
| 2010/0110798 A1 | 5/2010 | Hoei et al. |
| 2010/0115206 A1 | 5/2010 | de la Iglesia et al. |
| 2010/0118608 A1 | 5/2010 | Song et al. |
| 2010/0138592 A1 | 6/2010 | Cheon |
| 2010/0153616 A1 | 6/2010 | Garratt |
| 2010/0161936 A1 | 6/2010 | Royer et al. |
| 2010/0174959 A1 | 7/2010 | No et al. |
| 2010/0185807 A1 | 7/2010 | Meng et al. |
| 2010/0199027 A1 | 8/2010 | Pucheral et al. |
| 2010/0199125 A1 | 8/2010 | Reche |
| 2010/0199138 A1 | 8/2010 | Rho |
| 2010/0202196 A1 | 8/2010 | Lee et al. |
| 2010/0202239 A1 | 8/2010 | Moshayedi et al. |
| 2010/0208521 A1 | 8/2010 | Kim et al. |
| 2010/0257379 A1 | 10/2010 | Wang et al. |
| 2010/0262889 A1 | 10/2010 | Bains |
| 2010/0281207 A1 | 11/2010 | Miller et al. |
| 2010/0281342 A1 | 11/2010 | Chang et al. |
| 2010/0306222 A1 | 12/2010 | Freedman et al. |
| 2010/0332858 A1 | 12/2010 | Trantham et al. |
| 2010/0332863 A1 | 12/2010 | Johnston |
| 2011/0010514 A1* | 1/2011 | Benhase ................ G06F 3/061 711/162 |
| 2011/0022779 A1 | 1/2011 | Lund et al. |
| 2011/0022819 A1 | 1/2011 | Post et al. |
| 2011/0051513 A1 | 3/2011 | Shen et al. |
| 2011/0066597 A1 | 3/2011 | Mashtizadeh et al. |
| 2011/0066806 A1 | 3/2011 | Chhugani et al. |
| 2011/0072207 A1 | 3/2011 | Jin et al. |
| 2011/0072302 A1 | 3/2011 | Sartore |
| 2011/0078407 A1 | 3/2011 | Lewis |
| 2011/0078496 A1 | 3/2011 | Jeddeloh |
| 2011/0083060 A1 | 4/2011 | Sakurada et al. |
| 2011/0099460 A1 | 4/2011 | Dusija et al. |
| 2011/0113281 A1 | 5/2011 | Zhang et al. |
| 2011/0122691 A1 | 5/2011 | Sprouse |
| 2011/0131444 A1 | 6/2011 | Buch et al. |
| 2011/0138260 A1 | 6/2011 | Savin |
| 2011/0173378 A1 | 7/2011 | Filor et al. |
| 2011/0179249 A1 | 7/2011 | Hsiao |
| 2011/0199825 A1 | 8/2011 | Han et al. |
| 2011/0205823 A1 | 8/2011 | Hemink et al. |
| 2011/0213920 A1 | 9/2011 | Frost et al. |
| 2011/0222342 A1 | 9/2011 | Yoon et al. |
| 2011/0225346 A1 | 9/2011 | Goss et al. |
| 2011/0225347 A1 | 9/2011 | Goss et al. |
| 2011/0228601 A1 | 9/2011 | Olbrich et al. |
| 2011/0231600 A1 | 9/2011 | Tanaka et al. |
| 2011/0239077 A1 | 9/2011 | Bai et al. |
| 2011/0264843 A1 | 10/2011 | Haines et al. |
| 2011/0271040 A1 | 11/2011 | Kamizono |
| 2011/0283119 A1 | 11/2011 | Szu et al. |
| 2011/0289125 A1 | 11/2011 | Guthery |
| 2011/0320733 A1* | 12/2011 | Sanford ............... G06F 12/0871 711/135 |
| 2012/0011393 A1 | 1/2012 | Roberts et al. |
| 2012/0017053 A1 | 1/2012 | Yang et al. |
| 2012/0023144 A1 | 1/2012 | Rub |
| 2012/0026799 A1 | 2/2012 | Lee |
| 2012/0054414 A1 | 3/2012 | Tsai et al. |
| 2012/0063234 A1 | 3/2012 | Shiga et al. |
| 2012/0072639 A1 | 3/2012 | Goss et al. |
| 2012/0096217 A1 | 4/2012 | Son et al. |
| 2012/0110250 A1 | 5/2012 | Sabbag et al. |
| 2012/0117317 A1 | 5/2012 | Sheffler |
| 2012/0117397 A1 | 5/2012 | Kolvick et al. |
| 2012/0124273 A1 | 5/2012 | Goss et al. |
| 2012/0131286 A1 | 5/2012 | Faith et al. |
| 2012/0151124 A1 | 6/2012 | Baek et al. |
| 2012/0151253 A1 | 6/2012 | Horn |
| 2012/0151294 A1 | 6/2012 | Yoo et al. |
| 2012/0173797 A1 | 7/2012 | Shen |
| 2012/0173826 A1 | 7/2012 | Takaku |
| 2012/0185750 A1 | 7/2012 | Hayami |
| 2012/0195126 A1 | 8/2012 | Roohparvar |
| 2012/0203804 A1 | 8/2012 | Burka et al. |
| 2012/0203951 A1 | 8/2012 | Wood et al. |
| 2012/0210095 A1 | 8/2012 | Nellans et al. |
| 2012/0216079 A1 | 8/2012 | Fai et al. |
| 2012/0233391 A1 | 9/2012 | Frost et al. |
| 2012/0236658 A1 | 9/2012 | Byom et al. |
| 2012/0239858 A1 | 9/2012 | Melik-Martirosian |
| 2012/0239868 A1 | 9/2012 | Ryan et al. |

(56) References Cited

U.S. PATENT DOCUMENTS

| | | |
|---|---|---|
| 2012/0239976 A1 | 9/2012 | Cometti et al. |
| 2012/0246204 A1 | 9/2012 | Nalla et al. |
| 2012/0259863 A1 | 10/2012 | Bodwin et al. |
| 2012/0275466 A1 | 11/2012 | Bhadra et al. |
| 2012/0278564 A1 | 11/2012 | Goss et al. |
| 2012/0284574 A1 | 11/2012 | Avila et al. |
| 2012/0284587 A1 | 11/2012 | Yu et al. |
| 2012/0297122 A1 | 11/2012 | Gorobets |
| 2013/0007343 A1 | 1/2013 | Rub et al. |
| 2013/0007381 A1 | 1/2013 | Palmer |
| 2013/0031438 A1 | 1/2013 | Hu et al. |
| 2013/0036418 A1 | 2/2013 | Yadappanavar et al. |
| 2013/0038380 A1 | 2/2013 | Cordero et al. |
| 2013/0047045 A1 | 2/2013 | Hu et al. |
| 2013/0058145 A1 | 3/2013 | Yu et al. |
| 2013/0070527 A1 | 3/2013 | Sabbag et al. |
| 2013/0073784 A1 | 3/2013 | Ng et al. |
| 2013/0073798 A1 | 3/2013 | Kang et al. |
| 2013/0073924 A1 | 3/2013 | D'Abreu et al. |
| 2013/0079942 A1 | 3/2013 | Smola et al. |
| 2013/0103978 A1 | 4/2013 | Akutsu |
| 2013/0110891 A1 | 5/2013 | Ogasawara et al. |
| 2013/0111279 A1 | 5/2013 | Jeon et al. |
| 2013/0111298 A1 | 5/2013 | Seroff et al. |
| 2013/0117606 A1 | 5/2013 | Anholt et al. |
| 2013/0121084 A1 | 5/2013 | Jeon et al. |
| 2013/0124792 A1 | 5/2013 | Melik-Martirosian et al. |
| 2013/0124888 A1 | 5/2013 | Tanaka et al. |
| 2013/0128666 A1 | 5/2013 | Avila et al. |
| 2013/0132647 A1 | 5/2013 | Melik-Martirosian |
| 2013/0132652 A1 | 5/2013 | Wood et al. |
| 2013/0159609 A1 | 6/2013 | Haas et al. |
| 2013/0176784 A1 | 7/2013 | Cometti et al. |
| 2013/0179646 A1 | 7/2013 | Okubo et al. |
| 2013/0191601 A1 | 7/2013 | Peterson et al. |
| 2013/0194865 A1 | 8/2013 | Bandic et al. |
| 2013/0194874 A1 | 8/2013 | Mu et al. |
| 2013/0232289 A1 | 9/2013 | Zhong et al. |
| 2013/0238576 A1 | 9/2013 | Binkert et al. |
| 2013/0254498 A1 | 9/2013 | Adachi et al. |
| 2013/0254507 A1 | 9/2013 | Islam et al. |
| 2013/0258738 A1 | 10/2013 | Barkon et al. |
| 2013/0265838 A1 | 10/2013 | Li |
| 2013/0282955 A1 | 10/2013 | Parker et al. |
| 2013/0290611 A1 | 10/2013 | Biederman et al. |
| 2013/0297613 A1 | 11/2013 | Yu |
| 2013/0301373 A1 | 11/2013 | Tam |
| 2013/0304980 A1 | 11/2013 | Nachimuthu et al. |
| 2013/0314988 A1 | 11/2013 | Desireddi et al. |
| 2013/0343131 A1 | 12/2013 | Wu et al. |
| 2013/0346672 A1* | 12/2013 | Sengupta ............ G06F 12/0871 711/103 |
| 2014/0013027 A1 | 1/2014 | Jannyavula Venkata et al. |
| 2014/0013188 A1 | 1/2014 | Wu et al. |
| 2014/0025864 A1 | 1/2014 | Zhang et al. |
| 2014/0032890 A1 | 1/2014 | Lee et al. |
| 2014/0063905 A1 | 3/2014 | Ahn et al. |
| 2014/0067761 A1 | 3/2014 | Chakrabarti et al. |
| 2014/0071761 A1 | 3/2014 | Sharon et al. |
| 2014/0075133 A1 | 3/2014 | Li et al. |
| 2014/0082261 A1 | 3/2014 | Cohen et al. |
| 2014/0082310 A1 | 3/2014 | Nakajima |
| 2014/0082456 A1 | 3/2014 | Li et al. |
| 2014/0082459 A1 | 3/2014 | Li et al. |
| 2014/0095775 A1 | 4/2014 | Talagala et al. |
| 2014/0101389 A1 | 4/2014 | Nellans et al. |
| 2014/0115238 A1 | 4/2014 | Xi et al. |
| 2014/0122818 A1 | 5/2014 | Hayasaka et al. |
| 2014/0122907 A1 | 5/2014 | Johnston |
| 2014/0136762 A1 | 5/2014 | Li et al. |
| 2014/0136883 A1 | 5/2014 | Cohen |
| 2014/0136927 A1 | 5/2014 | Li et al. |
| 2014/0143505 A1 | 5/2014 | Sim et al. |
| 2014/0153333 A1 | 6/2014 | Avila et al. |
| 2014/0157065 A1 | 6/2014 | Ong |
| 2014/0173224 A1 | 6/2014 | Fleischer et al. |
| 2014/0181458 A1 | 6/2014 | Loh et al. |
| 2014/0201596 A1 | 7/2014 | Baum et al. |
| 2014/0223084 A1 | 8/2014 | Lee et al. |
| 2014/0244578 A1 | 8/2014 | Winkelstraeter |
| 2014/0258755 A1 | 9/2014 | Stenfort |
| 2014/0269090 A1 | 9/2014 | Flynn et al. |
| 2014/0279909 A1 | 9/2014 | Sudarsanam et al. |
| 2014/0310494 A1 | 10/2014 | Higgins et al. |
| 2014/0359044 A1 | 12/2014 | Davis et al. |
| 2014/0359381 A1 | 12/2014 | Takeuchi et al. |
| 2015/0023097 A1 | 1/2015 | Khoueir et al. |
| 2015/0032967 A1 | 1/2015 | Udayashankar et al. |
| 2015/0037624 A1 | 2/2015 | Thompson et al. |
| 2015/0153799 A1 | 6/2015 | Lucas et al. |
| 2015/0153802 A1 | 6/2015 | Lucas et al. |
| 2015/0212943 A1 | 7/2015 | Yang et al. |
| 2015/0268879 A1 | 9/2015 | Chu |
| 2015/0286438 A1 | 10/2015 | Simionescu et al. |

FOREIGN PATENT DOCUMENTS

| | | |
|---|---|---|
| EP | 1 990 921 A2 | 11/2008 |
| EP | 2 386 958 A1 | 11/2011 |
| EP | 2 620 946 A2 | 7/2013 |
| JP | 2002-532806 S | 10/2002 |
| WO | WO 2007/036834 A2 | 4/2007 |
| WO | WO 2007/080586 A2 | 7/2007 |
| WO | WO 2008/075292 | 6/2008 |
| WO | WO 2008/121553 | 10/2008 |
| WO | WO 2008/121577 | 10/2008 |
| WO | WO 2009/028281 A1 | 3/2009 |
| WO | WO 2009/032945 A1 | 3/2009 |
| WO | WO 2009/058140 A1 | 5/2009 |
| WO | WO 2009/084724 | 7/2009 |
| WO | WO 2009/134576 A1 | 11/2009 |
| WO | WO 2011/024015 | 3/2011 |

OTHER PUBLICATIONS

International Search Report and Written Opinion dated Mar. 7, 2014, received in International Patent Application No. PCT/US2013/074772, which corresponds to U.S. Appl. No. 13/831,218, 10 pages (George).

International Search Report and Written Opinion dated Mar. 24, 2014, received in International Patent Application No. PCT/US2013/074777, which corresponds to U.S. Appl. No. 13/831,308, 10 pages (George).

International Search Report and Written Opinion dated Mar. 7, 2014, received in International Patent Application No. PCT/US2013/074779, which corresponds to U.S. Appl. No. 13/831,374, 8 pages (George).

Invitation to Pay Additional Fees dated Feb. 13, 2015, received in International Patent Application No. PCT/US2014/063949, which corresponds to U.S. Appl. No. 14/135,433, 6 pages (Delpapa).

International Search Report and Written Opinion dated Jan. 21, 2015, received in International Application No. PCT/US2014/059748, which corresponds to U.S. Appl. No. 14/137,511, 13 pages (Dancho).

International Search Report and Written Opinion dated Feb. 18, 2015, received in International Application No. PCT/US2014/066921, which corresponds to U.S. Appl. No. 14/135,260, 13 pages (Fitzpatrick).

Ashkenazi et al., "Platform independent overall security architecture in multi-processor system-on-chip integrated circuits for use in mobile phones and handheld devices," ScienceDirect, Computers and Electrical Engineering 33 (2007), 18 pages.

Lee et al., "A Semi-Preemptive Garbage Collector for Solid State Drives," Apr. 2011, IEEE, pp. 12-21.

Office Action dated Feb. 17, 2015, received in Chinese Patent Application No. 201210334987.1, which corresponds to U.S. Appl. No. 12/082,207, 9 pages (Prins).

International Search Report and Written Opinion dated May 4, 2015, received in International Patent Application No. PCT/US2014/065987, which corresponds to U.S. Appl. No. 14/135,400, 12 pages (George).

(56) References Cited

OTHER PUBLICATIONS

International Search Report and Written Opinion dated Mar. 17, 2015, received in International Patent Application No. PCT/US2014/067467, which corresponds to U.S. Appl. No. 14/135,420, 13 pages (Lucas).
International Search Report and Written Opinion dated Apr. 20, 2015, received in International Patent Application No. PCT/US2014/063949, which corresponds to U.S. Appl. No. 14/135,433, 21 pages (Delpapa).
International Search Report and Written Opinion dated Mar. 9, 2015, received in International Patent Application No. PCT/US2014/059747, which corresponds to U.S. Appl. No. 14/137,440, 9 pages (Fitzpatrick).
Bayer, "Prefix B-Trees", ip.com Journal, ip.com Inc., West Henrietta, NY, Mar. 30, 2007, 29 pages.
Bhattacharjee et al., "Efficient Index Compression in DB2 LUW", IBM Research Report, Jun. 23, 2009, http://domino.research.ibm.com/library/cyberdig.nsf/papers/40B2C45876D0D747852575E100620CE7/$File/rc24815.pdf, 13 pages.
Oracle, "Oracle9i: Database Concepts", Jul. 2001, http://docs.oracle.com/cd/A91202_01/901_doc/server.901/a88856.pdf, 49 pages.
International Search Report and Written Opinion dated Jun. 8, 2015, received in International Patent Application No. PCT/US2015/018252, which corresponds to U.S. Appl. No. 14/339,072, 9 pages (Busch).
International Search Report and Written Opinion dated Jun. 2, 2015, received in International Patent Application No. PCT/US2015/018255, which corresponds to U.S. Appl. No. 14/336,967, 14 pages (Chander).
International Search Report and Written Opinion dated Jun. 30, 2015, received in International Patent Application No. PCT/US2015/023927, which corresponds to U.S. Appl. No. 14/454,687, 11 pages (Kadayam).
Office Action dated Dec. 8, 2014, received in Chinese Patent Application No. 201180021660.2, which corresponds to U.S. Appl. No. 12/726,200, 7 pages (Olbrich).
Office Action dated Jul. 31, 2015, received in Chinese Patent Application No. 201180021660.2, which corresponds to U.S. Appl. No. 12/726,200, 9 pages (Olbrich).
International Search Report and Written Opinion dated Jul. 23, 2015, received in International Patent Application No. PCT/US2015/030850, which corresponds to U.S. Appl. No. 14/298,843, 12 pages (Ellis).
IBM Research-Zurich, "The Fundamental Limit of Flash Random Write Performance: Understanding, Analysis and Performance Modeling," Mar. 31, 2010, pp. 1-15.
International Search Report and Written Opinion dated Sep. 14, 2015, received in International Patent Application No. PCT/US2015/036807, which corresponds to U.S. Appl. No. 14/311,152, 9 pages (Higgins).
Gasior, "Gigabyte's i-Ram storage device, Ram disk without the fuss," The Tech Report, p. 1, Jan. 25, 2006, 5 pages.
Oestreicher et al., "Object Lifetimes in Java Card," 1999, USENIX, 10 pages.
International Preliminary Report on Patentability dated May 24, 2016, received in International Patent Application No. PCT/US2014/065987, which corresponds to U.S. Appl. No. 14/135,400, 9 pages (George).
Office Action dated Apr. 25, 2016, received in Chinese Patent Application No. 201280066282.4, which corresponds to U.S. Appl. No. 13/602,047, 8 pages (Tai).
International Preliminary Report on Patentability dated Dec. 6, 2016, received in International Patent Application No. PCT/US2015/030850, which corresponds to U.S. Appl. No. 14/298,843, 8 pages (Ellis).
International Preliminary Report on Patentability dated Dec. 20, 2016, received in International Patent Application No. PCT/US2015/036807, which corresponds to U.S. Appl. No. 14/311,152, 6 pages (Higgins).
Canim, Buffered Bloom ilters on Solid State Storage, ADMS*10, Singapore, Sep. 13-17, 2010, 8 pgs.
Lu, A Forest-structured Bloom Filter with Flash Memory, MSST 2011, Denver, CO, May 23-27, 2011, article, 6 pgs.
Lu, A Forest-structured Bloom Filter with Flash Memory, MSST 2011, Denver, CO, May 23-27, 2011, presentation slides, 25 pgs.
SanDisk Enterprise IP LLC, International Search Report / Written Opinion, PCT/US2012/059447, Jun. 6, 2013, 12 pgs.
SanDisk Enterprise IP LLC, International Search Report / Written Opinion, PCT/US2012/059453, Jun. 6, 2013, 12 pgs.
SanDisk Enterprise IP LLC, International Search Report / Written Opinion, PCT/US2012/065914, May, 23, 2013, 7 pgs.
SanDisk Enterprise IP LLC, International Search Report / Written Opinion, PCT/US2012/065919, Jun. 17, 2013, 8 pgs.
SanDisk Enterprise IP LLC, Notification of the Decision to Grant a Patent Right for Patent for Invention, CN 200880127623.8, Jul. 4, 2013, 1 pg.
Barr, Introduction to Watchdot Timers, Oct. 2001, 3 pgs.
Kang, A Multi-Channel Architecture for High-Performance NAND Flash-Based Storage System, J. Syst. Archit., 53, Sep. 9, 2007, 15 pgs.
Kim, A Space-Efficient Flash Translation Layer for CompactFlash Systems, May 2002, 10 pgs.
McLean, Information Technology—AT Attachment with Packet Interface Extension, Aug. 19, 1998, 339 pgs.
Park, A High Performance Controller for NAND Flash-Based Solid State Disk (NSSD), Feb. 12-16, 2006, 4 pgs.
Pliant Technology, International Search Report / Written Opinion, PCT/US08/88133, Mar. 19, 2009, 7 pgs.
Pliant Technology, International Search Report / Written Opinion, PCT/US08/88136, Mar. 19, 2009, 7 pgs.
Pliant Technology, International Search Report / Written Opinion, PCT/US08/88146, Feb. 26, 2009, 10 pgs.
Pliant Technology, International Search Report / Written Opinion, PCT/US08/88154, Feb. 27, 2009, 9 pgs.
Pliant Technology, Written Opinion, PCT/US08/88164, Feb. 13, 2009, 6 pgs.
Pliant Technology, International Search Report / Written Opinion, PCT/US08/88206, Feb. 18, 2009, 8 pgs.
Pliant Technology, International Search Report / Written Opinion, PCT/US08/88217, Feb. 19, 2009, 7 pgs.
Pliant Technology, International Search Report / Written Opinion, PCT/US08/88229, Feb. 13, 2009, 8 pgs.
Pliant Technology, International Search Report / Written Opinion, PCT/US08/88232, Feb. 19, 2009, 8 pgs.
Pliant Technology, International Search Report / Written Opinion, PCT/US08/88236, Feb. 19, 2009, 7 pgs.
Pliant Technology, International Search Report / Written Opinion, PCT/US2011/028637, Oct. 27, 2011, 11 pgs.
Pliant Technology, Supplementary ESR, 08866997.3, Feb. 23, 2012, 6 pgs.
SanDisk Enterprise IP LLC, International Search Report / Written Opinion, PCT/US2012/042771, Mar. 4, 2013, 14 pgs.
SanDisk Enterprise IP LLC, International Search Report / Written Opinion, PCT/US2012/065916, Apr. 5, 2013, 7 pgs.
SanDisk Enterprise IP LLC, International Search Report / Written Opinion, PCT/US2012/042764, Aug. 31, 2012, 12 pgs.
SanDisk Enterprise IP LLC, International Search Report / Written Opinion, PCT/US2012/042775, Sep. 26, 2012, 9 pgs.
SanDisk Enterprise IP LLC, International Search Report / Written Opinion, PCT/US2012/059459, Feb. 14, 2013, 9 pgs.
SanDisk Enterprise IP LLC, Office Action, CN 200880127623.8, Apr. 18, 2012, 12 pgs.
SanDisk Enterprise IP LLC, Office Action, CN 200880127623.8, Dec. 31, 2012, 9 pgs.
SanDisk Enterprise IP LLC, Office Action, JP 2010-540863, Jul. 24, 2012, 3 pgs.
Watchdog Timer and Power Savin Modes, Microchip Technology Inc., 2005.

(56) References Cited

OTHER PUBLICATIONS

Zeidman, 1999 Verilog Designer's Library, 9 pgs.
Office Action dated Jan. 11, 2017, received in Chinese Patent Application No. 201280066282.4, which corresponds to U.S. Appl. No. 13/602,047, 3 pages (Tai).

\* cited by examiner

AUTOMATIC READ AND WRITE ACCELERATION OF DATA ACCESSED BY VIRTUAL MACHINES

RELATED APPLICATIONS

This application claims priority to U.S. Provisional Patent Application No. 61/684,646, filed Aug. 17, 2012, which is hereby incorporated by reference in its entirety.

TECHNICAL FIELD

The disclosed embodiments relate generally to accelerating access to data read and written by a set of virtual machines through the selective use of a persistent cache.

BACKGROUND

Server virtualization is the masking of physical server resources (e.g., processors, memory, etc.) from users of the server. Such server resources include the number and identifications of individual physical servers, processors and operating systems. Server virtualization more efficiently utilizes server resources, improves server availability and assists in testing and development.

Virtualized enterprise data centers deploy tens of thousands of virtual machines over hundreds of physical servers. Efficient hardware utilization is a key goal in improving virtual machine systems. One of the main factors contributing to efficient hardware utilization is virtual machine density. The more virtual machines that can be run on a physical server the more efficient the hardware utilization.

Access to server storage resources is often a system bottleneck that prevents full utilization of available hardware resources. The embodiments described below are configured to improve access to server storage resources.

SUMMARY

A server system, executing a plurality of virtual machines, accelerates frequently accessed data in a persistent cache. The persistent cache is shared by the plurality of virtual machines, and the persistent cache is typically much smaller in capacity than secondary storage; thus, only a small subset of secondary storage is accelerated. Determining which data to accelerate (e.g., which portions of the virtual disks used by the virtual machines in the server system to accelerate), however, is challenging and non-automated processes are non-workable. For example, the management of acceleration by IT personnel or a system administrator would be difficult, if not impossible, in systems having hundreds or thousands of virtual machines. Various embodiments of the systems and methods described here are therefore designed for automatic management of data access acceleration in a server system that executes a plurality of virtual machines.

The server system retains and updates access history information for portions (e.g., blocks or sub-blocks) of the objects (e.g., virtual disks) associated with data access commands received from the virtual machines. In accordance with the access history information and an access based acceleration policy the server system determines which portions of the objects to accelerate. The shared persistent cache significantly improves input-output (I/O) performance of a respective server system executing a plurality of virtual machines, leading to an increase in the number of virtual machines that can run on each server system in a virtualized data center.

BRIEF DESCRIPTION OF THE DRAWINGS

Like reference numerals refer to corresponding parts throughout the drawings.

DESCRIPTION OF EMBODIMENTS

Figure 1:
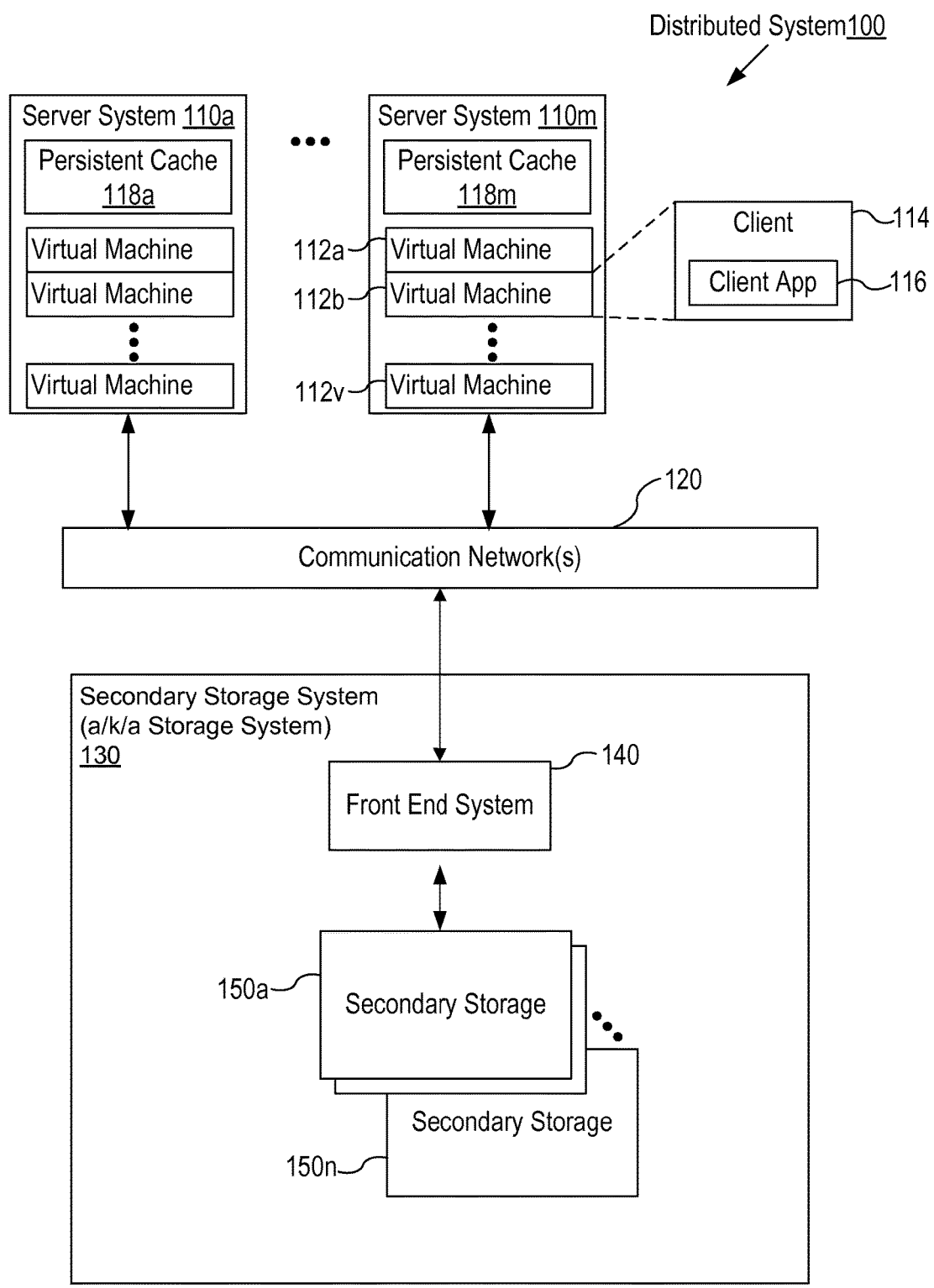
FIG. 1 is a block diagram of a distributed system, in accordance with some embodiments.

This detailed description covers methods and systems for automatic management of disk acceleration in a distributed system having a plurality of virtual machines running on each of a set of physical servers. Other related concepts will also be covered in this detailed description.

In some embodiments, a method for accelerating data access is performed by a computer system having one or more processors, memory and a persistent cache for storing accelerated data. The method includes: receiving data access commands from two or more clients to access data in objects identified by the data access commands; and processing the data access commands to update access history information for portions of the objects identified by the data access commands from the two or more clients. The method further includes: in accordance with the access history information, automatically identifying and marking for acceleration portions of the objects identified by the data access commands that satisfy an access based data acceleration policy, where the automatically identifying and marking are performed collectively for the two or more clients; and accelerating the object portions marked for acceleration, by accelerating data access, including either or both accelerating data writes and data reads of the object portions to and from the persistent cache, where the persistent cache is shared by the two or more clients, and the access history information is based on the data access commands of the two or more clients.

In some embodiments, a method for accelerating data read operations is performed by a computer system having one or more processors, memory and a persistent cache for storing accelerated data. The method includes receiving data read commands from two or more clients to read data from objects identified by the data read commands and processing the data read commands to update usage history information for portions of the objects identified by the data read commands. The method further includes determining whether a respective portion of the objects identified by a data read command from a respective client of the two or more clients is stored in the persistent cache, where the persistent cache is shared by the two or more clients. In accordance with a determination that the respective portion of the objects identified by the data read command from the respective client is stored in the persistent cache, the method includes returning the respective portion of the objects from the persistent cache to the respective client of the two or more clients. In accordance with a determination that the respective portion of the objects identified by the data read command from the respective client is not stored in the persistent cache, the method includes identifying and marking for acceleration the respective portion of the objects identified by the data read command from the respective client if the respective portion of the objects satisfies an access based data acceleration policy in accordance with the usage history information. In accordance with a determination that the respective portion of the objects is not marked for acceleration, the method includes processing the data read command from the respective client, by reading from the secondary storage the respective portion of the objects, and returning the respective portion of the objects read from the secondary storage to the respective client of the two or more clients. In accordance with a determination that the respective portion of the objects is marked for acceleration, the method includes processing the data read command from the respective client by reading from the secondary storage the respective portion of the objects, writing the respective portion of the objects to the persistent cache, and returning the respective portion of the objects to the respective client of the two or more clients.

In some embodiments, a method for accelerating data write operations is performed by a computer system having one or more processors, memory and a persistent cache for storing accelerated data. The method includes: receiving data write commands from two or more clients to write data to objects identified by the data write commands, where the persistent cache is shared by the two or more clients; and processing the data write commands to update usage history information for portions of the objects identified by the one or more data write commands. The method further includes automatically identifying and marking for acceleration a respective portion of the objects if the respective portion of the objects satisfies an access based data acceleration policy in accordance with the access history information, where the automatically identifying and marking are performed collectively for the two or more clients. In accordance with a determination that the respective portion of the objects is marked for acceleration, the method includes writing the respective portion of the objects to the persistent cache and subsequently or concurrently writing the respective portion of the objects to the secondary storage. In accordance with a determination that the respective portion of the objects is not marked for acceleration, the method includes writing the respective portion of the objects to the secondary storage.

In another aspect, a computer system includes one or more processors, a persistent cache for storing accelerated data, and memory storing one or more programs for execution by the one or more processors, wherein the one or more programs include instructions that when executed by the one or more processors cause the server system to perform any of the aforementioned methods.

In yet another aspect, a non-transitory computer readable medium stores one or more programs that when executed by one or more processors of a computer system cause the computer system to perform any of the aforementioned methods.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a block diagram of a distributed system 100 including a secondary storage system 130 (sometimes called a storage system) connected to a plurality of computer systems 110 (e.g., server systems 110a through 110m) through a communication network 120 such as the Internet, other wide area networks, local area networks, metropolitan area networks, wireless networks, or any combination of such networks. In some embodiments, a respective server system 110 executes a plurality of virtual machines 112 and includes a respective persistent cache 118 shared by the plurality of virtual machines executed on the respective server system 110. In some embodiments, the persistent cache 118 comprises non-volatile solid state storage, such as flash memory. In some other examples, persistent cache 118, comprises EPROM, EEPROM, battery backed SRAM, battery backed DRAM, supercapacitor backed DRAM, ferroelectric RAM, magnetoresistive RAM, or phase-change RAM.

In some implementations, each of the plurality of the virtual machines 112 is a client 114. Each client 114 executes one or more client applications 116 (e.g., a financial application or web hosting application) that submit data access commands (e.g., data read and write commands) to the respective server system 110. The data access commands access data in objects, such as virtual disks, some portions of which may be stored in RAM in by the server, while other portions are stored in storage system 130. The respective server system 110, in turn, sends corresponding data access commands to storage system 130 so as to obtain or store data in accordance with the data access commands.

In some embodiments, secondary storage system 130 includes a front-end system 140, which obtains and processes data access commands from server systems 110 and returns results to the server systems 110. Secondary storage system 130 further includes one or more secondary storage subsystems 150 (e.g., storage subsystems 150a-150n). In some embodiments, a respective storage systems stores the data for one or more objects (e.g., one or more virtual disks) accessible to clients on a respective server system 110. Each of the one or more objects comprises a plurality of portions. For example, a respective portion of the plurality of portions of an object is a block (also herein called an address block, since the block corresponds to a block of addresses), and the block comprises a plurality of sub-blocks (e.g., a respective sub-block is a page within a block). In another example, a portion of the object is a sub-block (also herein called an address sub-block, since the sub-block corresponds to an address or sub-block of addresses).

In some embodiments, a server system 110 allocates a distinct address space to each respective virtual machine 112 executed on the server system 110, and furthermore allocates space within the address space for one or more objects (e.g., one or more virtual disks). In some embodiments, each object accessed by a respective virtual machine 112 is denoted by a corresponding object identifier (Object ID), or in the case of a virtual disk, a virtual disk ID.

Figure 2:
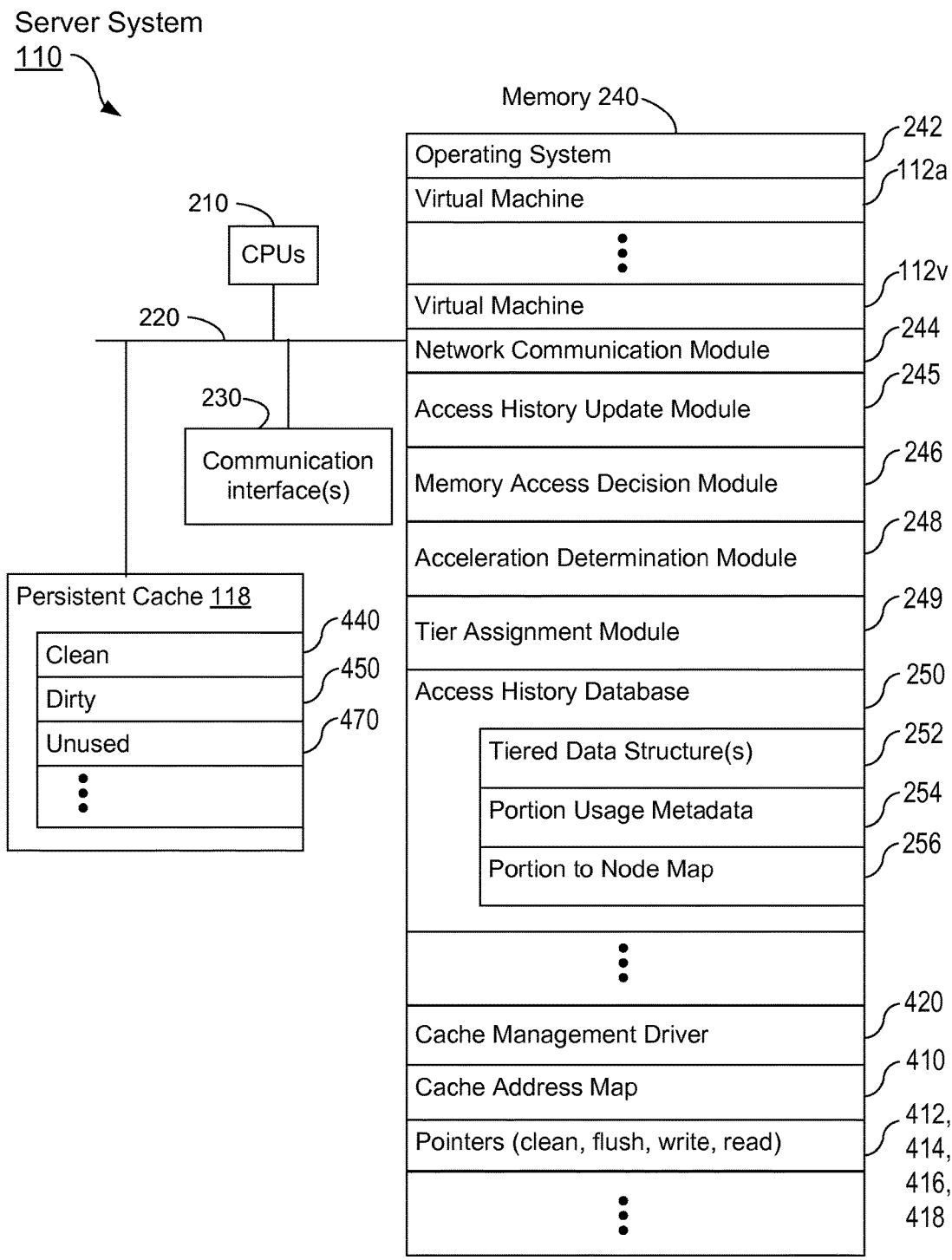
FIG. 2 is a block diagram of a server system included in FIG. 1, in accordance with some embodiments.

FIG. 2 is a block diagram of a server system 110 (sometimes herein called a computer system). Server system 110 includes one or more processors or processing units (CPUs) 210, one or more communication interfaces 230, memory 240, persistent cache 118, and one or more communication buses 220 for interconnecting these components. The communication buses 220 may include circuitry (sometimes called a chipset) that interconnects and controls communications between system components. Memory 240 includes high-speed random access memory and optionally includes non-volatile memory. In some embodiments, memory 240 comprises a non-transitory computer readable storage medium. In some implementations, memory 240 stores the following programs, modules and data structures, or a subset or superset thereof:

an operating system 242 including procedures for handling various basic system services and performing hardware dependent tasks;
a plurality of virtual machines 112 (e.g., virtual machines 112a to 112v in FIG. 1);
a network communication module 244 configured to connect server system 110 to communication network(s) 120 in FIG. 1 via the one or more communication interfaces 230;
an access history update module 245 configured to update information within access history database 250;
a memory access decision module 246 configured to determine whether a respective portion of an object (e.g., a block or sub-block of an object identified by a data access command) is present in persistent cache 118;
an acceleration determination module 248 configured to determine whether to accelerate various portions (e.g., blocks or sub-blocks) of the objects accessed by data access commands received from two or more clients;
a tier assignment module 249 at least configured to assign (or reassign) respective portions (e.g., blocks) of the objects to tiers within tiered data structure 252;
an access history database 250 configured to store one or more items of usage history information, including tiered data structure 252 configured to organize portions (e.g., blocks) of the objects into a plurality of tiers, object portion usage metadata 254 and object portion to node map 256 configured to map a respective portion (e.g., a block) of the objects to a corresponding node of a plurality of nodes 320 in access history database 250;
a cache management driver 420, described below;
a cache address map 410, described below; and
a plurality of pointers including clean pointer 412, flush pointer 414, read pointer 418 and write pointer 416.

Each of the elements identified above may be stored in one or more of the previously mentioned memory devices of server system 110, and each element corresponds to a set of instructions for performing a function described above. The modules or programs (i.e., sets of instructions) identified above need not be implemented as separate software programs, procedures or modules, and thus various subsets of these modules may be combined or otherwise re-arranged in various embodiments.

Figure 3A:
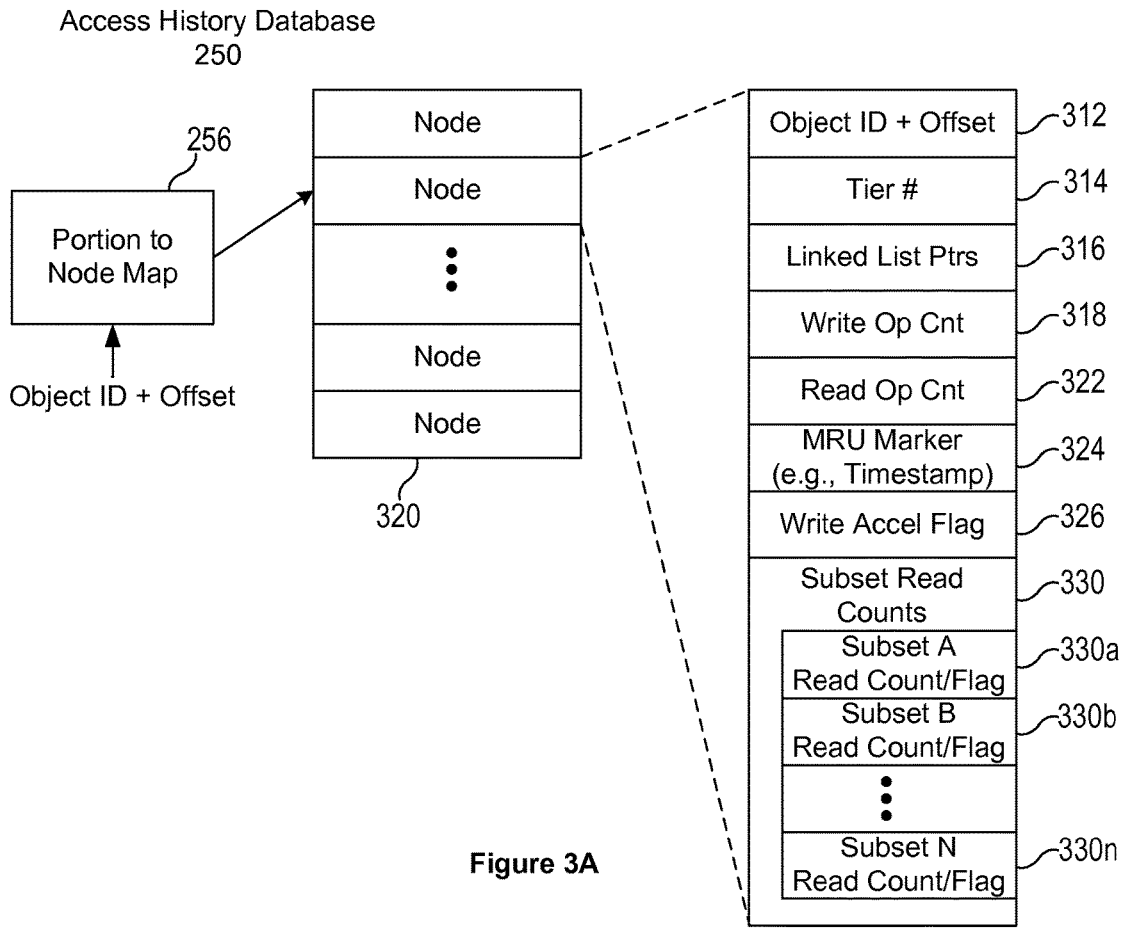
FIGS. 3A-3B illustrate data structures utilized by the server system included in FIG. 2, in accordance with some embodiments.

FIG. 3A illustrates a plurality of data structures within access history database 250, including a plurality of nodes 320 (also sometimes called node data structures), each of which stores access history information, as well as other information, for a portion of an object. In accordance with a respective object identifier (object ID), portion to node map 256 maps the portion (e.g., a block) of an object to a node 320 in access history database 250. Each node 320, excluding any unallocated nodes, contains information associated with the state and access history of a corresponding portion (e.g., a block, also sometimes called an address block) of an object. In some implementations, each respective node 320 of two or more of the nodes 320 includes the following items of information, or a subset or superset thereof:

an object ID plus offset 312 identifying the object portion (i.e., the portion of an object) corresponding to the respective node;
a tier number 314 identifying the tier within tiered data structure 252 to which the respective node (and the object portion corresponding to the node) belongs;
two or more linked list pointers 316 identifying nodes that re positioned immediately before and after the respective node in linked list 360; linked list 360 is list of all the nodes 320 assigned to the same tier as the respective node (i.e., the tier have the tier number in field 314);
a write operations count 318 indicating a number of times data has been written to the respective portion of the objects (e.g., the respective block) corresponding to the respective node;
a read operations count 322 indicating a number of times data has been read from the object portion corresponding to the respective node;
a most recently used (MRU) marker 324 indicating the last time an operation was performed on the object portion corresponding to the respective node; in some implementations, the MRU marker is a timestamp indicating execution time for the last operation performed on the respective object portion; in some other implementations, the MRU marker stores an operation count value (similar to a serial number or other sequentially assigned value) indicating the last operation performed on the object portion corresponding to the respective node;
a write acceleration flag 326 indicating whether the object portion corresponding to the respective node is marked for write acceleration; and
a plurality of subset read counts 330, each indicating a number of times that data has been read from a respective subset of the object portion (e.g., a sub-block of an address block of an object) corresponding to the respective node.

In some implementations, each subset read count 330 has a value of 0 (not read), 1 (read once) or 2 (read 2 or more times). Subset read counts 330 function as read acceleration flags, where values 0 and 1 correspond to a flag value of "off" or "disabled," and a value of 2 corresponds to a flag value of "on" or "enabled." Furthermore, any attempt to increment a subset read count 330 that is already equal to 2 results in a value of 2 for the sub-block.

Figure 3B:
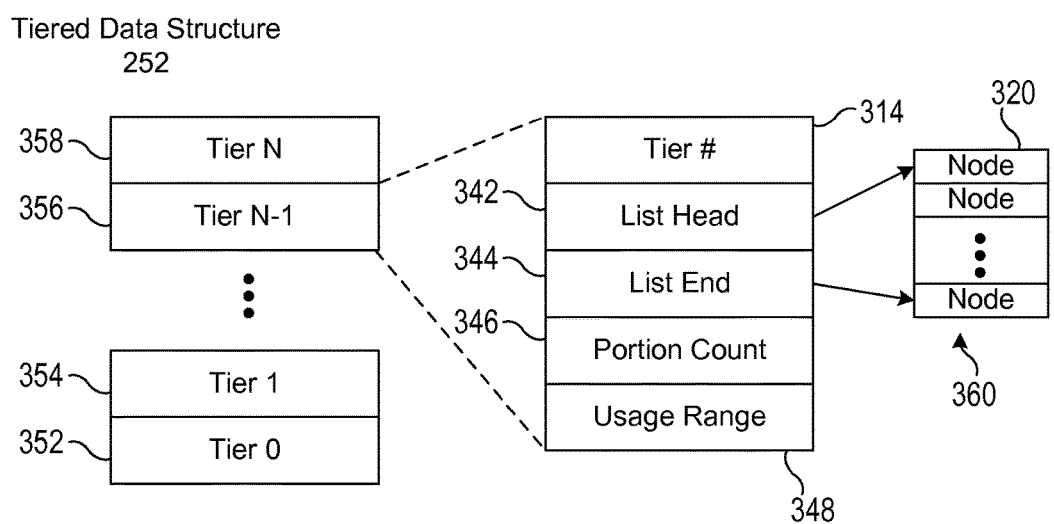

FIG. 3B illustrates tiered data structure 252, which is part of usage history database 250, according to some embodiments. In some embodiments, tiered data structure 252 is a bucket array, with each bucket representing a different tier. Tiered data structure 252 contains tier numbers 0-N (e.g., tiers 352-358), where N is a positive integer greater than 1 and typically greater than 10 once the server system has processed a large number of data access commands. In some implementations, each tier of tiered data structure 252 includes the following items of information, or a subset or superset thereof:

a tier number 314;
a list head 342 containing a pointer to the head of a linked list 360 of nodes 320 within a respective tier;
a list end 344 containing a pointer to the end of the linked list 360 of nodes 320 within the respective tier;
a portion count 346 containing the number of object portions (e.g., address blocks) represented by the plurality of nodes 320 in the linked list 360; and a usage range indicator 348 designating the range of usage counts for object portions (e.g., address blocks) within the respective tier.

The plurality of tiers within tiered data structure 252 are arranged such that the lowest tier contains object portions (e.g., address blocks) having the lowest "usage rate," and the highest tier contains object portions (e.g., address blocks) having the highest "usage rate." Tier assignment module 249 is configured to assign each tier a range of usage rates (e.g., indicated via usage range indicator 348) corresponding to the usage rates of the object portions (e.g., address blocks) eligible for assignment to that tier. For example, all object portions (e.g., address blocks) with a usage rate of 1-3 are assigned to Tier 0 (the lowest tier), all object portions (e.g., address blocks) with a usage rate of 4-6 are assigned to Tier 1, etc.

In some embodiments, tier assignment module 249 is configured to determine a "usage rate" or a usage history value for an object portion (e.g., address block) by, for example, combining the write operations count 318 for the object portion with the read operations count 322 for the object portion. Tier assignment module 249 is configured to assign a respective object portion (e.g., a respective address block) to a tier based on the usage rate of the respective object portion and the usage range indicators 348 assigned to the plurality of tiers. For example, if the respective address block has a usage rate of 2, tier assignment module 249 will assign the respective address block to tier 0, where the usage range of tier 0 is 1-3. If the usage rate for a respective address block increases above the usage range assigned to a particular tier to which the block is currently assigned, then tier assignment module 249, for example, re-assigns the respective address block to a higher tier. Similarly, if the usage rate for a respective address block decreases below the usage range assigned to a particular tier to which the block is currently assigned, then tier assignment module 249, for example, re-assigns the respective address block to a lower tier.

In some embodiments, the object portions (e.g., address blocks) assigned to a respective tier are represented by a linked list 360 of nodes 320. Each node 320 of the plurality of nodes 320 stores usage history for a respective object portion (e.g., a respective address block). In some implementations, the head of the linked list 360 is associated with a node 320 corresponding to the most recently updated object portion (e.g., address block) in the respective tier, and the end of the linked list 360 is associated with a node 320 corresponding to the least recently updated object portion (e.g., address block) in the respective tier.

Figure 4:
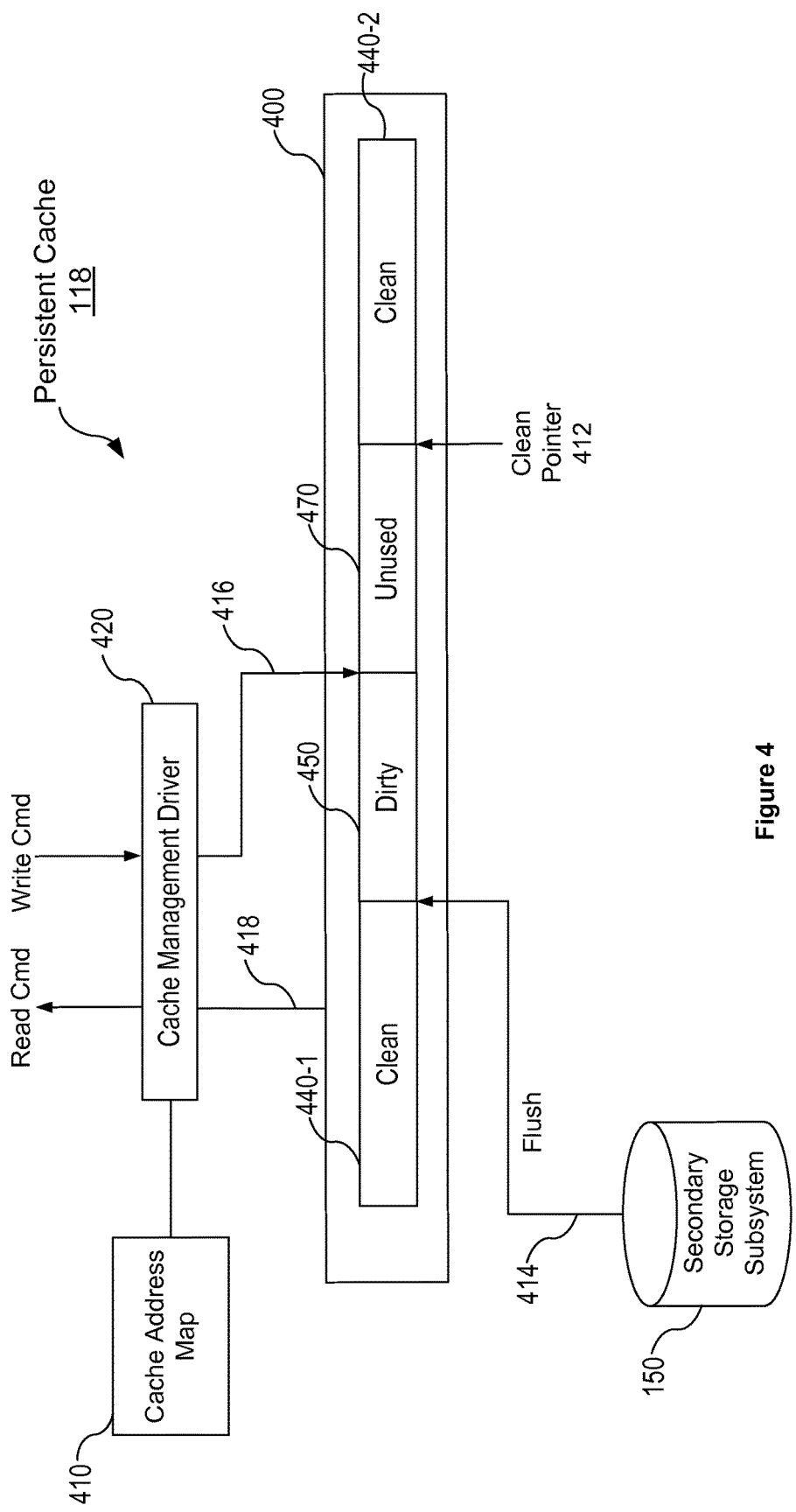
FIG. 4 is a schematic diagram of a persistent cache, in accordance with some embodiments.

Referring to FIG. 4, in some embodiments, data for accelerated portions of the objects (e.g., address blocks and/or sub-blocks) is stored in a persistent cache 118, which is implemented as a "log-structured cache." That is, the persistent cache 118 (sometimes herein called "the cache," for ease of discussion) provides caching services to a plurality of system components (e.g., multiple client systems or virtual machines), while being structured as a log, with data and metadata being sequentially written to the cache storage device. In this manner, persistent cache 118 operates as a circular buffer. The advantages of operating persistent cache 118 as a circular buffer include simplicity (particularly reduced internal metadata management requirements), automatic wear leveling of memory locations within persistent cache 118, and automatic garbage collection, which essentially eliminates the risk of stale data in the persistent cache 118 crowding out (e.g., preventing storage of) more current data in persistent cache 118. In some embodiments, a single log-structured persistent cache 118 is used to store cached data for multiple virtual machines (e.g., all virtual machines executed by a respective server system 110), thereby eliminating the need to separately manage the caching of data for each of the virtual machines.

In some embodiments, persistent cache 118 includes clean region 440, dirty region 450 and unused region 470. Both clean region 440 and dirty region 450 store cached data, while unused region 470 is an "empty" portion of persistent cache 118 that is ready to be overwritten with new data. Any of the clean, dirty and unused regions can be wrapped over the end boundary of persistent cache 118. In FIG. 4, for example, clean regions 440-1 and 440-2 are logically a single clean region 440 that is wrapped over the end boundary of persistent cache 118. Due to persistent cache 118 operating as a circular buffer, as will be explained below, the boundaries of the clean, dirty and unused regions 440, 450, 470 are adjusted as data is added to persistent cache 118 and as data is removed from the persistent cache 118. Additional information regarding the functioning of a log-structured cache as illustrated in FIG. 4 is found in U.S. Patent Application Publication No. 2011/0320733, which is hereby incorporated by reference in its entirety.

In some implementations, data stored in the log-structured cache (persistent cache 118) includes data corresponding to both write and read caches. Accordingly, the write and read caches share a circular buffer, and, in some implementations, write and read data are intermingled in the log-structured cache. In other implementations, the write and read caches are maintained separately in separate circular buffers, either in the same persistent cache 118, or in separate instances of persistent cache 118.

In some implementations, dirty region 450 contains both read and write cached data. In some implementations, write data in dirty region 450 is data stored in persistent cache 118, but not yet flushed to secondary storage system 130 (e.g., any of secondary storage subsystems 150 in FIG. 1). Write data stored in persistent cache 118 (whether in clean region 440 or dirty region 450) is said to be "accelerated." The beginning of dirty region 450 is represented by flush pointer 414, and the end of dirty region 450 is represented by write pointer 416. As cache write data is flushed to secondary storage system 130, flush pointer 414 is advanced (e.g., incremented) so that it points to the next segment of write data not yet flushed to secondary storage. Similarly, write pointer 416 is advanced as new blocks of write data are stored to persistent cache 118, thereby "moving" a portion of persistent cache 118 that was formerly in unused region 470 into dirty region 450. Clean region 440, which is bounded at its beginning by clean pointer 412 and at its end by flush pointer 414, stores cached data that is also stored in secondary storage. Typically, clean region 440 stores both cached read data and write data, both of which are said to be "accelerated."

Unused region 470, bounded at its beginning by write pointer 416 and at its end by clean pointer 412, represents an "empty" portion of persistent cache 118 that is ready to be overwritten with new data. In some implementations, unused region 470 corresponds to flash memory regions that have been erased in preparation for storing "new" blocks or sub-blocks of data that have been selected for acceleration, as well as updated data for blocks or sub-blocks already stored in persistent cache 118.

Both clean region 440 and dirty region 450 store cached data (data for accelerated address block and/or sub-blocks) for multiple virtual machines (e.g., all the virtual machines executed by a respective server system 110). The cached data for the various virtual machines is interleaved within the clean region 440 and dirty region 450 and ordered within the clean region 440 and dirty region 450 in the same order (sometimes called log order) that the data was written to persistent cache 118.

Cache address map 410 maps accelerated portions of the objects (e.g., address sub-blocks) to specific locations in persistent cache 118. Cache address map 410 is used, when reading cached data from persistent cache 118, to locate requested data in persistent cache 118. In some embodiments, cache address map 410 is apportioned on a sub-block by sub-block basis. Cache management driver 420 handles both data read and write commands directed to persistent cache 118.

Figure 5A:
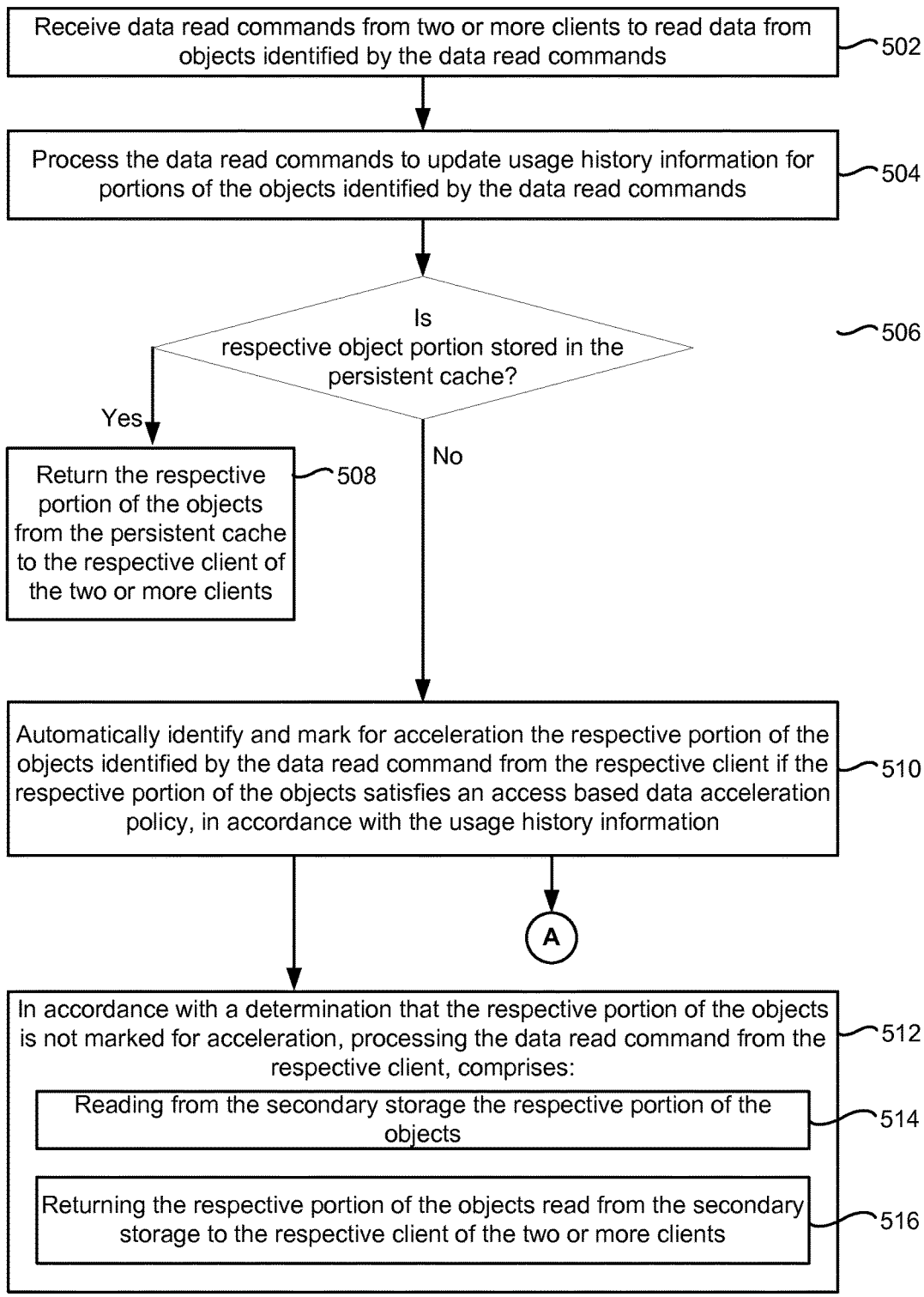
FIGS. 5A-5B illustrate a flow diagram of a process for accelerating data read operations, in accordance with some embodiments.
Figure 5B:
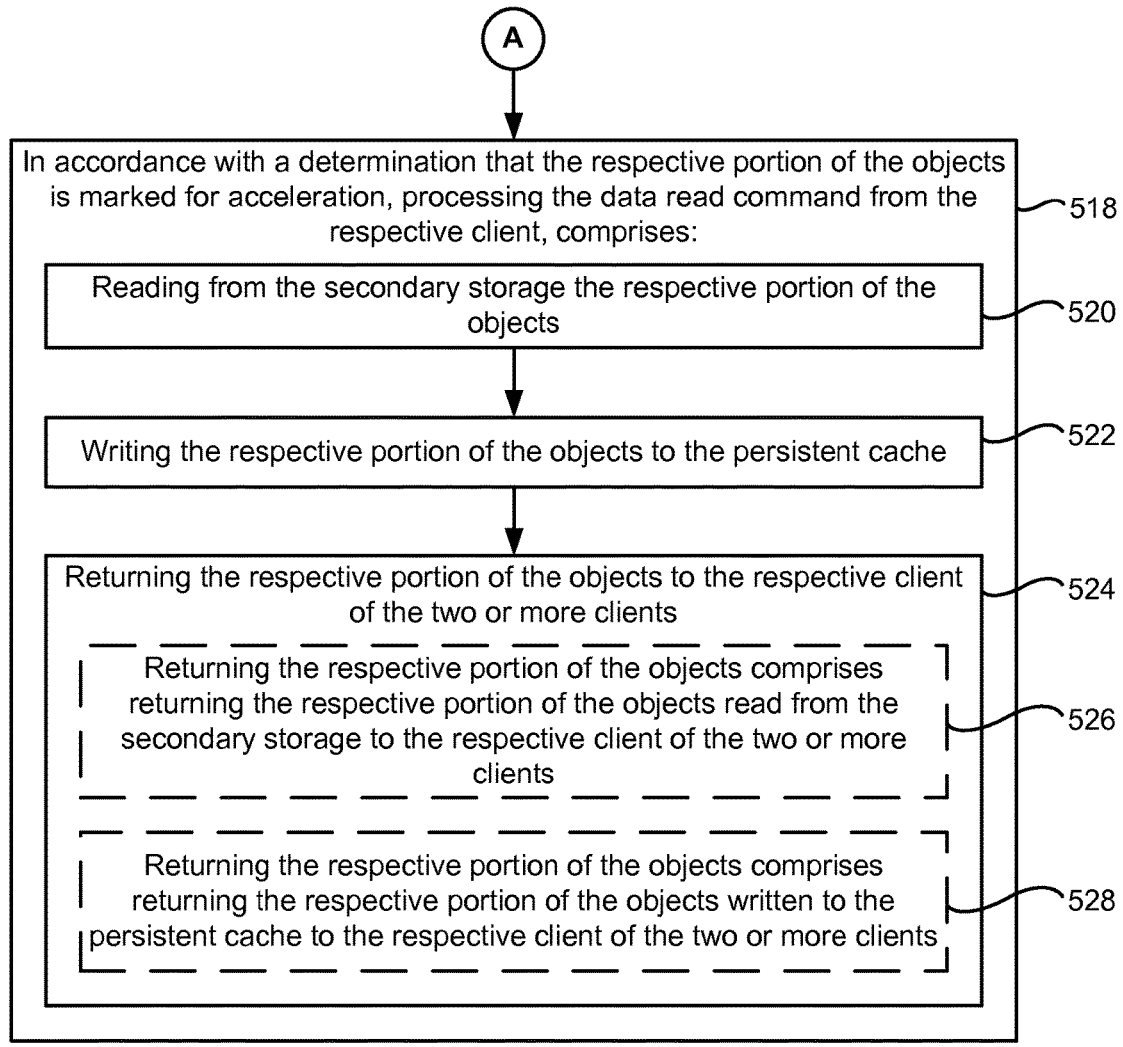

FIGS. 5A-5B illustrate a flow diagram of a method 500 for accelerating data read operations performed by a computer system (e.g., server system 110 in FIG. 1) having one or more processors, memory and a persistent cache for storing accelerated data. In some embodiments, method 500 is governed by a set of instructions stored in memory (e.g., a non-transitory computer readable storage media) that are executed by the one or more processors of the computer system.

The computer system receives (502) data read commands from two or more clients to read data from objects identified by the data read commands. FIG. 1, for example, shows a respective server system 110 (sometimes herein called a computer system) configured to receive data reads commands from two or more virtual machines (sometimes herein called clients 114) executed on respective server system 110 to read data from objects (e.g., one or more virtual disks) identified by the data read commands. In various embodiments, the number of virtual machines from which a respective server system 110 receives data read commands is more than 20, more than 50, or more than 100.

The computer system processes (504) the data read commands to update usage history information for portions of the objects identified by the data read commands. FIG. 2, for examples, shows access history update module 245 (a component of server system 110) configured to process the data read commands to update usage history information in access history database 250 for portions of the objects (e.g., address blocks or sub-blocks) identified by the data read commands. For example, access history update module 245 is configured to update object portion usage metadata 254 within access history database 250 for portions (e.g., address sub-blocks) of the objects identified by the data read commands.

Referring to FIG. 3A, for example, access history update module 245 is configured to increment a read operations count 322 and update an MRU marker 324 within access history data base 250 for each respective node of the plurality of nodes 320 corresponding to the portions of the objects (e.g., the address blocks) identified by the data read commands. In this example, access history update module 245 is further configured to increment one or more subset read counts 330 within the nodes of access history data base 250 corresponding to the one or more portions of the object(s) (e.g., one or more sub-blocks of the address block) identified by the data read commands.

In some implementations, access history update module 245 is also configured to decrement a read operations count 322 or write operations count 318 within access history data base 250 for each respective node of a plurality of nodes 320 corresponding to a portion of the objects (e.g., an address block) not identified by any data access command received within a predefined period of time, or alternatively not identified by any data access command of a predefined number of data access commands received by the computer system from the clients. Stated another way, in some implementations, the read operations count 322 or write operations count 318 for object portions not recently accessed are decremented, where "not recently accessed" is automatically determined either periodically or each time a predefined number of data access commands have been received. Furthermore, as described in more detail below, the tiers to which those object portions are assigned and the object portions to mark for acceleration are re-evaluated in accordance with the decremented read operations count 322.

The computer system determines (506) whether a respective portion of the objects identified by a data read command from a respective client of the two or more clients is stored in the persistent cache. FIG. 2, for example, shows memory access decision module 246 (a component of server system 110) configured to determine whether a respective portion of the objects (e.g., an address sub-block) identified by a data read command from a respective client (e.g., virtual machine 112*a*) of the two or more clients (e.g., virtual machines 111*a* to 112*v* in FIG. 1) is stored in persistent cache 118. In some embodiments, memory access decision module 246 module makes such a determination based on cache address map 410.

In accordance with a determination that the respective portion of the objects identified by the data read command from the respective client is stored in the persistent cache, the computer system returns (508) the respective portion of the objects from the persistent cache to the respective client of the two or more clients. FIG. 2, for example, shows server system 110 configured to return a respective object portion (e.g., address sub-block) from persistent cache 118 to the respective client (e.g., virtual machine 112*a*) in accordance with the previous determination by memory access decision module 246 that the respective portion is stored in persistent cache 118.

In accordance with a determination that the respective portion of the objects identified by the data read command from the respective client is not stored in the persistent cache, the computer system automatically identifies and marks (510) for acceleration the respective portion of the objects identified by the data read command from the respective client if the respective portion of the objects satisfies an access based data acceleration policy, in accordance with the usage history information. The automatic identification and marking of object portions is performed collectively for the two or more clients. FIG. 2, for example, shows acceleration determination module 248 (a component of server system 110) configured to automatically identify and mark for read acceleration a respective object portion (e.g., a respective address sub-block identified by a data read command from a respective client, such as virtual machine 112*v*) if the object portion satisfies an access based data acceleration policy, in accordance with the usage history information. In this example, acceleration determination module 248 is configured to perform these operations in accordance with a previous determination by memory access decision module 246 that the respective object portion identified by the data read command from the respective client is not stored in persistent cache 118 (e.g., cache address map 410 indicates that the respective portion is not present in persistent cache 118). In some embodiments, an object portion (e.g., the respective address sub-block identified by the data read command from the respective client) satisfies the data access acceleration policy and is marked for acceleration when (A) the node for the respective object portion is assigned to a tier that is above the "low-water mark" for acceleration (as described in more detail below), and furthermore the subset read count 330 corresponding to the respective portion indicates a value of 2 or "enabled."

In accordance with a determination that the respective portion of the objects is not marked for acceleration, the computer system processes (512) the data read command from the respective client, by: reading (514) from the secondary storage the respective portion of the objects; and returning (516) the respective portion of the objects read from the secondary storage to the respective client of the two or more clients. FIG. 2, for example, shows server system 110 configured to process the data read command from the respective client (e.g., virtual machine 112a) by reading the respective portion (e.g., a respective address sub-block) from secondary storage 150 (e.g., within secondary storage system 130 in FIG. 1) via network communications module 244. Server system 110, as shown in FIG. 2, is further configured to return the respective portion (e.g., the respective address sub-block) read from secondary storage 150 to the respective client (e.g., virtual machine 112a). In this example, server system 110 is configured to perform these operations in accordance with the previous determination by acceleration determination module 248 that the respective portion (e.g., the respective address sub-block) of the objects is not marked for acceleration. In some embodiments, an object portion (e.g., the respective address sub-block) identified by the data read command from a client is not marked for acceleration when either (A) the subset read count 330 corresponding to the object portion indicates a value of 0 or 1 or "disabled," or (B) the address block that includes the object portion has a usage rate (e.g., the sum of the write operation count 318 and read operation count 322 for the address block, see FIG. 3A) that does not meet the minimum usage rate that qualifies address blocks for acceleration.

In accordance with a determination that the respective portion of the objects is marked for acceleration, the computer system processes (518) the data read command from the respective client, by: (520) reading from the secondary storage the respective portion of the objects; writing (522) the respective portion of the objects to the persistent cache; and returning (524) the respective portion of the objects to the respective client of the two or more clients. FIG. 2, for example, shows server system 110 configured to process the data read command from the respective client (e.g., virtual machine 112a) by reading an object portion (e.g., a respective address sub-block identified by the data read command from the respective client, e.g., virtual machine 112a) from secondary storage 150 (e.g., within secondary storage system 130 in FIG. 1) via network communications module 244. FIG. 2 shows server system 110 further configured to write the object portion (e.g., the respective address sub-block) read from secondary storage 150 to persistent cache 118. FIG. 2, for example, further shows server system 110 configured to return the object portion (e.g., the respective address sub-block) to the respective client (e.g., virtual machine 112a). In this example, server system 110 is configured to perform these operations in accordance with the previous determination by acceleration determination module 248 that the object portion (e.g., the respective address sub-block identified by the data read command from the respective client) is marked for acceleration.

In some embodiments, returning the respective portion of the objects comprises returning (526) the respective portion of the objects read from the secondary storage to the respective client of the two or more clients. For example, in some implementations, the object portion read from secondary storage is written to an intermediate buffer (not shown in the figures), and then copied from the intermediate buffer to a memory location at which the requesting client receives the object; and furthermore the same data (object portion) is copied from the intermediate buffer to the persistent cache (522). In some implementations, to minimize latency, the requested object portion is returned to the requesting client prior to the same data being written to persistent cache 118. FIG. 2, for examples, shows server system 110 configured to return the object portion (e.g., the respective address sub-block) from secondary storage 150 to the respective client (e.g., virtual machine 112a) of the two or more clients.

Alternatively, in some embodiments, returning the respective portion of the objects comprises returning (528) the respective portion of the objects from the persistent cache to the respective client of the two or more clients. FIG. 2, for example, shows server system 110 configured to return the object portion (e.g., the respective address sub-block) from persistent cache 118 to the respective client (e.g., virtual machine 112a) of the two or more clients.

Figure 6:
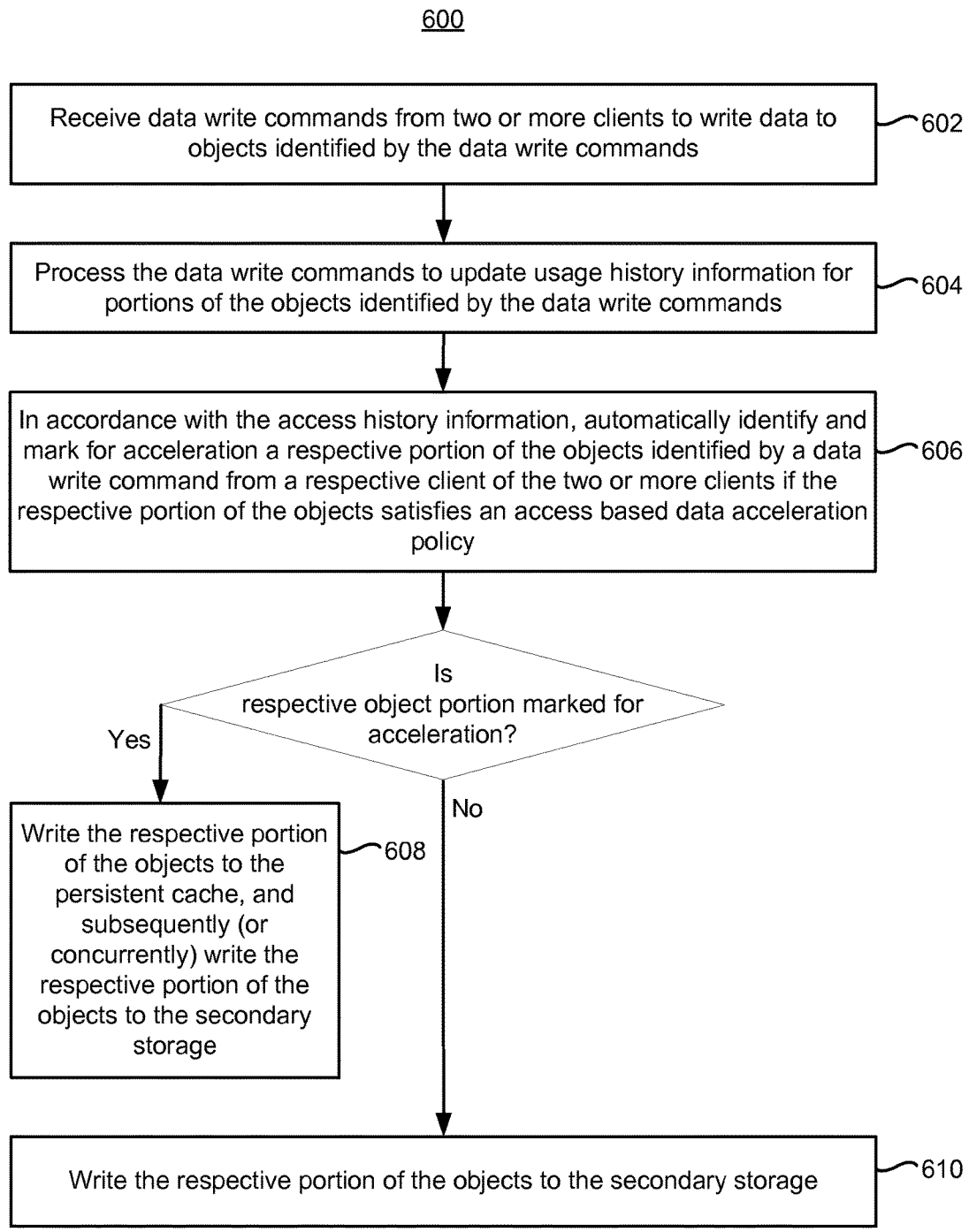
FIG. 6 illustrates a flow diagram of a process for accelerating data write operations, in accordance with some embodiments.

FIG. 6 illustrates a flow diagram of a method 600 for accelerating data write operations performed by a computer system (e.g., server system 110 in FIG. 1) having one or more processors, memory and a persistent cache for storing accelerated data. In some embodiments, method 600 is governed by a set of instructions stored in memory (e.g., a non-transitory computer readable storage media) that are executed by the one or more processors of the computer system.

The computer system receives (602) data write commands from two or more clients to write data to objects identified by the data write commands. FIG. 1, for example, shows a respective server system 110 configured to receive data write commands from two or more virtual machines executed on respective server system 110 to write data to objects (e.g., one or more virtual disks) identified by the data write commands.

The computer system processes (604) the data write commands to update usage history information for portions of the objects identified by the data write commands. FIG. 2, for example, shows access history update module 245 configured to process the data write commands to update usage history information in access history database 250 for portions of the objects (e.g., address blocks) identified by the data write commands. For example, access history update module 245 is configured to update address portion usage metadata 254 within access history database 250 for portions (e.g., address blocks) of the objects identified by the data write commands. Referring to FIG. 3A, for example, access history update module 245 is configured to increment a write operations count 318 and update an MRU marker 324 within access history data base 250 for each respective node of the plurality of nodes 320 corresponding to the object portions (e.g., address blocks) identified by the data write commands.

Furthermore, as discussed above, in some implementations, access history update module 245 is also configured to decrement a read operations count 322 or write operations count 318 within access history data base 250 for each respective node of a plurality of nodes 320 corresponding to a portion of the objects (e.g., an address block) not identified by any data access command received within a predefined period of time, or alternatively not identified by any data access command of a predefined number of data access commands received by the computer system from the clients.

In accordance with the access history information, the computer system automatically identifies and marks (606)

for acceleration a respective portion of the objects identified by a data write command from a respective client of the two or more clients satisfying an access based data acceleration policy. FIG. 2, for example, shows acceleration determination module 248 configured to automatically identify and mark for write acceleration a respective object portion (e.g., a respective address block identified by a data write command from a respective client, such as virtual machine 112v) satisfying an access based data acceleration policy, in accordance with the usage history information. In some embodiments, the respective object portion (e.g., the respective address block identified by the data write command from the respective client) satisfies the access based data acceleration policy when a write acceleration flag 326 for the node associated with the respective portion (e.g., the respective address block) is enabled (e.g., indicates a flag value of 1). In some embodiments, a write acceleration flag 326 for the node corresponding to an object portion (e.g., address block) is enabled when the node is assigned to a tier within tiered data structure 252 that qualifies the corresponding object portions for acceleration.

In some embodiments, only a predefined number of object portions (e.g., address blocks) qualify for acceleration based on the storage capacity of the persistent cache 118. In some embodiments, acceleration determination module 248 is configured to identify a "low-water mark" for object portions (e.g., address blocks) that meet the minimum usage rate that "qualifies for acceleration." For example, in a server system 110 comprising a persistent cache with storage capacity to accelerate data from 800,000 address blocks, acceleration determination module 248 is configured to identify the tiers with the highest usage rates whose total number of address blocks is, in the aggregate, no more than 800,000. The 'low-water mark" identifies a respective object portion (e.g., address block), or, set of object portions (e.g., a set of address blocks), in a respective tier (e.g., tier Y, for ease of reference) having the minimum usage rate included in the 800,000 accelerated object portions. Acceleration determination module 248 is configured to mark all object portions (e.g., address blocks) corresponding to nodes in tier Y for write acceleration (e.g., the respective write acceleration flags 326 for all address blocks in tier Y are enabled). In some implementations, one or more object portions (e.g., one or more address blocks) in tier Y below the 'low-water mark" are also marked for write acceleration. Furthermore, acceleration module 248 marks all portions of the objects (e.g., all address blocks) in tiers above tier Y (i.e., all tiers having usage rate ranges higher than tier Y) for write acceleration (e.g., the respective write acceleration flags 326 for all address blocks in these tiers are enabled). It is noted that the "low water mark" qualifying a portion of the objects (e.g., an address block) for acceleration changes over time, due to fluctuations in the concentration of data read and data write commands.

In accordance with a determination that the respective portion of the objects is marked for acceleration, the computer system writes (608) the respective portion of the objects to the persistent cache and subsequently or concurrently writes the respective portion of the objects to the secondary storage. If a write-back caching methodology is used, the source of the data subsequently written to secondary storage is persistent storage and the write to secondary storage occurs at a later time (e.g., when more room is needed in unused region 470 (FIG. 4) for writing new data to persistent cache 118). If a write-through caching methodology is used, the source of the data written to secondary storage is either the client (which concurrently sends the data to persistent storage and secondary storage) or persistent storage. FIG. 2, for example, shows server system 110 configured to write an object portion (e.g., an address block identified by the data write command from the respective client, such as virtual machine 112a) to the persistent cache 118. FIG. 2, for examples, further shows server system 110 configured to subsequently write the object portion (e.g., an address block identified by the data write command from the respective client, such as virtual machine 112a) to secondary storage 150 (e.g., within secondary storage system 130 in FIG. 1). In this example, server system 110 is configured to perform these operations in accordance with the previous determination by acceleration determination module 248 that the object portion block is marked for acceleration.

In some implementations, server system 110 is configured to implement a write-through methodology whereby, for example, the respective object portion (e.g., the respective address block) identified by the data write command from the respective client is concurrently written to persistent cache 118 and secondary storage 150. In some implementations, server system 110 is configured to implement a write-back methodology whereby, for example, the respective object portion (e.g., the respective address block) identified by the data write command from the respective client is written to persistent cache 118 and subsequently written to secondary storage after some delay. In this example, persistent cache 118 is configured as a circular buffer (also called a log-structured cache) as discussed above with respect to FIG. 4, whereby the respective object portion (e.g., the respective address block) is written to secondary storage 150 when the respective object portion stored in dirty region 450 is subsequently flushed to secondary storage 150. The respective object portion is then retained in clean region 440 of persistent cache 118 until that portion of clean region 440 is reclaimed for inclusion in unused region 470.

In accordance with a determination that the respective portion of the objects is not marked for acceleration, the computer system writes (610) the respective portion of the objects to the secondary storage. FIG. 2, for example, shows server system 110 configured to write a respective object portion (e.g., a respective address block) identified by the data write command from a respective client (e.g., virtual machine 112a) to secondary storage 150 via network communications module 244 in accordance with a previous determination by acceleration determination module 248 that the respective object portion (e.g., the respective address block) is not marked for acceleration.

Figure 7A:
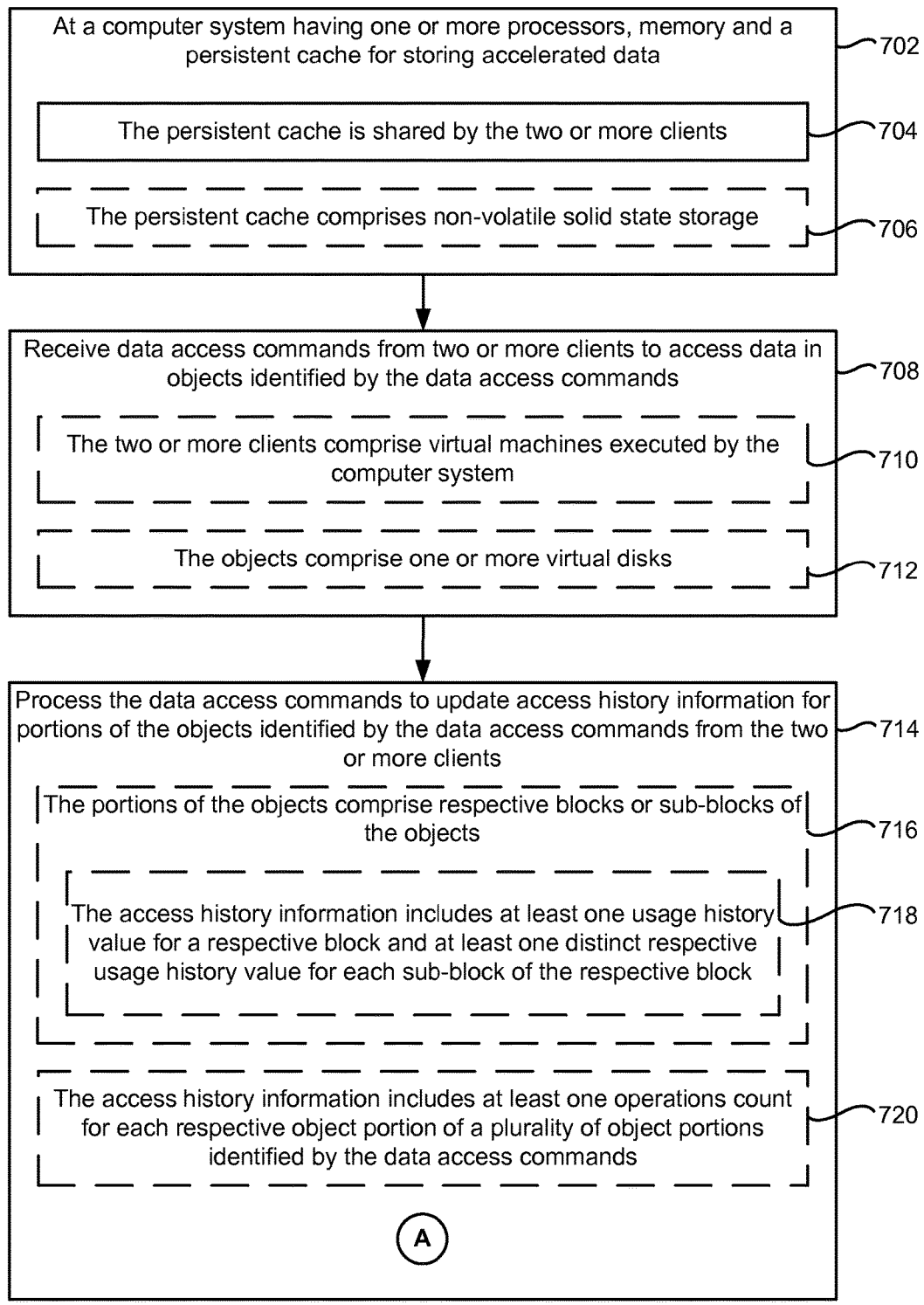
FIGS. 7A-7B illustrate a flow diagram of a process for accelerating data access, in accordance with some embodiments.
Figure 7B:
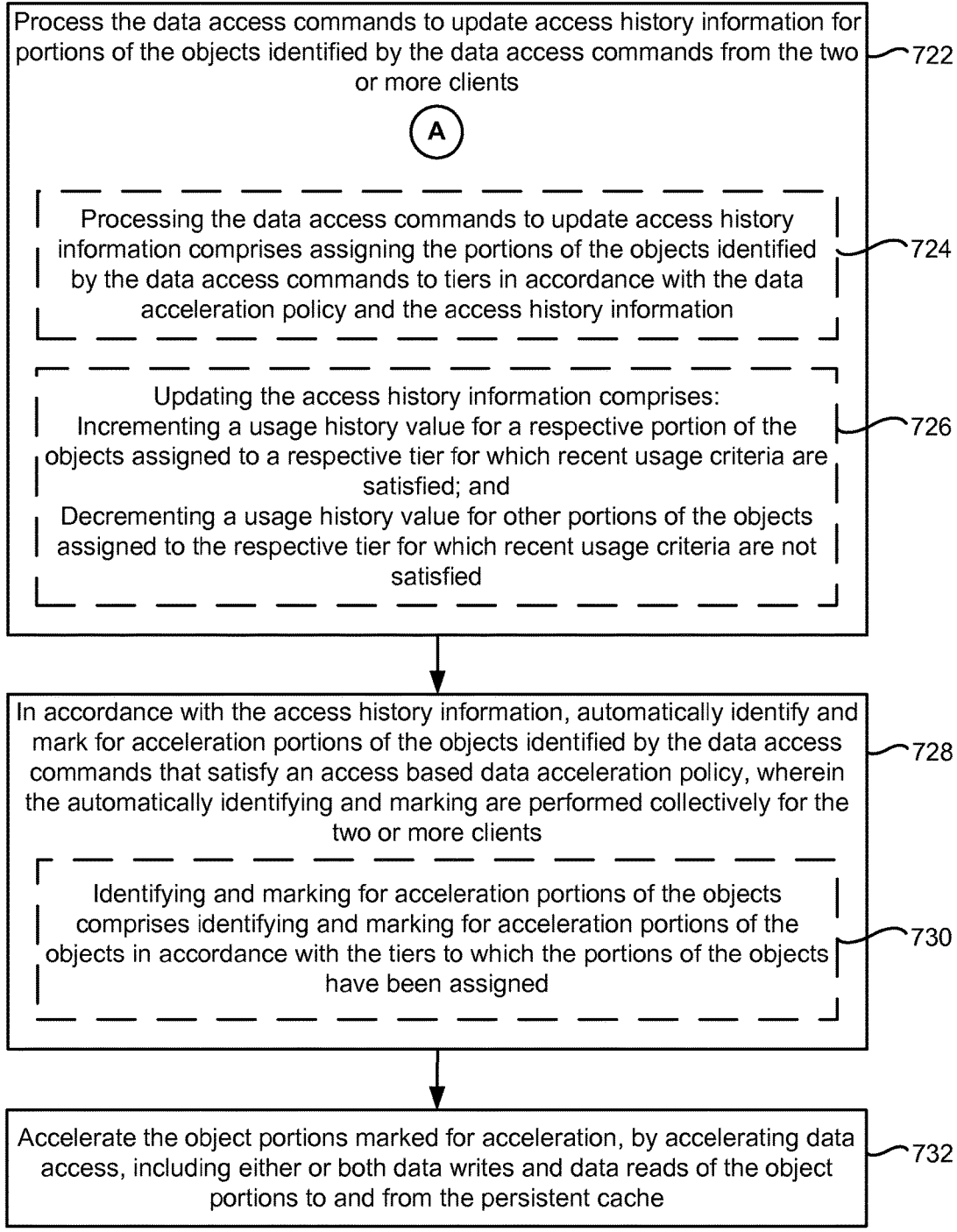

FIGS. 7A-7B illustrate a flow diagram of a method 700 for accelerating data access performed by a computer system (e.g., server system 110 in FIG. 1). The computer system includes (702) one or more processors, memory and a persistent cache for storing accelerated data. In some embodiments, method 700 is governed by a set of instructions stored in memory (e.g., a non-transitory computer readable storage media) that are executed by the one or more processors of the computer system.

The persistent cache is shared (704) by the two or more clients. FIG. 1, for example, shows server system 110m configured to share persistent cache 118m between virtual machines 112a-112v. For example, each virtual machine executed on server system 110m is a client. In some embodiments, the persistent cache comprises (706) non-volatile solid state storage, such as flash memory, or any of the other examples of non-volatile storage provided above.

The computer system receives (708) data access commands from two or more clients to access data in objects identified by the data access commands. FIG. 1, for example, shows a respective server system 110 configured to receive data access commands from two or more clients executed on respective server system 110 to access data objects identified by the data access commands. In some embodiments, the two or more clients comprise (710) virtual machines executed by the computer system. FIG. 1, for example, shows server system 110*m* executing a plurality of virtual machines (e.g., virtual machines 112*a*-112*v*). In some embodiments, the objects comprise (712) one or more virtual disks. FIG. 1, for examples, shows secondary storage system 130 comprising a plurality of secondary storage subsystems (e.g., secondary storages 150*a*-150*n*). In this example, each secondary storage subsystem 150 comprises one or more virtual disks containing data accessible to the two or more clients.

The computer system processes (714) the data access commands from the two or more clients to update access history information for portions of the objects identified by the data access commands from the two or more clients, where the access history information is based on the data access commands of the two or more clients. FIG. 2, for example, shows access history update module 245 configured to process the data access commands to update access history information in access history database 250 for portions of the objects (e.g., address blocks or sub-blocks) identified by the data read commands. For example, access history update module 245 is configured to update a write operations count 318, a read operations count 322 and an MRU marker 324 within access history database 250 corresponding to each portion of the objects (e.g., each address block) identified by the data access commands. In some embodiments, access history update module 245 is further configured to update one or more subset read counts 330 within access history database 250 corresponding to one or more subsets of the portions of the objects (e.g., one or more address sub-blocks) identified by the data access commands when the data access commands comprise data read commands.

Furthermore, as described above, in some embodiments access history update module 245 is also configured to decrement a write operations count 318 or a read operations count 322 within access history database 250 corresponding to each of the portions of the objects (e.g., address block) not identified by the data access commands. In some embodiments, access history update module 245 is configured to update one or more of the aforementioned data structures within access history database 250 either upon receiving data access commands or based on predefined criteria (e.g., upon receiving a predefined number of data access commands or after a predefined period of time).

In some embodiments, the portions of the objects comprise (716) respective blocks or sub-blocks of the objects. For example, a portion of the objects is a block (sometimes called an address block, as discussed above), and the block comprises a plurality of sub-blocks. In another example, a portion of the objects is a sub-block. In some embodiments, the access history information includes (718) at least one usage history value for a respective block and at least one distinct respective usage history value for each sub-block of the respective block. FIG. 3A, for example, shows items of information for a respective node corresponding to an object portion (e.g., the portion of a virtual disk, or other object, called a block or address block). In this example, the items of information include a write operations count 318 for the node corresponding to the object portion (e.g., the address block), a read operations count 322 for the respective node corresponding to the object portion (e.g., the address block) and one or more of subset read counts 330 for the respective node corresponding to each of one or more of subsets of the object portion (e.g., one or more address sub-blocks of the address block).

In some embodiments, the access history information includes (720) at least one operations count for each respective object portion of a plurality of object portions identified by the data access commands. FIG. 3A, for example, shows a write operations count 318 and a read operations count 322 for a respective node corresponding to a portion of the objects (e.g., an address block of a virtual disk). As will be understood to one skilled in the art, in this example, access history database 250 similarly includes items of information for all other nodes 320, which correspond to other object portions (e.g., remaining address blocks) identified by data access commands received from the two or more clients.

In some embodiments, processing the data access commands to update access history information comprises assigning (724) the object portions identified by the data access commands to tiers in accordance with the data acceleration policy and the access history information. FIG. 2, for examples shows, tier assignment module 249 configured to assign (or reassign) object portions (e.g., address blocks) to tiers in accordance with the data acceleration policy and the access history information. For example, as discussed above with reference to FIGS. 3B and 6, tier assignment module 249 is configured to determine respective usage rates for the object portions (e.g., address blocks) identified by the data access commands. Tier assignment module 249 is further configured to assign the object portions to tiers based on the respective usage rates for the portions of the objects and the usage range indicators 348 assigned to the plurality of tiers.

In some embodiments, updating the access history information comprises (726): incrementing a usage history value for a respective portion of the objects assigned to a respective tier for which recent usage criteria are satisfied; and decrementing a usage history value for other portions of the objects assigned to the respective tier for which recent usage criteria are not satisfied. Recent usage criteria are satisfied when a respective portion of the objects (e.g., a respective address block) is identified in one or more current data access commands, or MRU marker 324 corresponding to the respective portion of the objects (e.g., the respective address block) indicates that the respective portion of the objects has been accessed within a predefined period of time, or, alternatively, less than a predefined number of data access commands have been received since the respective portion of the objects was last identified in any of the data access commands received by the server system. Recent usage criteria are not satisfied when a respective portion of the objects (e.g., a respective address block) is not identified in the one or more current data access commands and the respective portion of the objects has not been identified in any data access commands for a predefined period of time or, alternatively, a predefined number of data access commands have been received by the server system 110 since the respective portion of the objects was last identified in any data access commands.

As discussed above with respect to FIG. 3B, in some embodiments, tier assignment module 249 is configured to determine a "usage rate" or a usage history value for a respective portion of the objects (e.g., a respective address block) by, for example, combining the write operations count 318 for the respective portion of the objects with the read operations count 322 for the respective portion of the objects.

In accordance with the access history information, the computer system automatically identifies and marks (728) for acceleration portions of the objects identified by the data access commands that satisfy an access based data acceleration policy, where the automatically identifying and marking are performed collectively for the two or more clients. FIG. 2, for example, shows acceleration determination module 248 configured to identify and mark for acceleration portions of the objects (e.g., address blocks or sub-blocks) identified by the data read command from the respective client satisfying an access based data acceleration policy, in accordance with the usage history information. The above discussion of FIG. 5A provides a detailed description of marking portions of the objects (e.g., address sub-blocks) for read acceleration, and the above discussion of FIG. 6 provides a detailed description of marking portions of the objects (e.g., address blocks) for write acceleration. In some embodiments, read acceleration is determined on a sub-block by sub-block basis, and write acceleration is determined on a block-by-block basis.

In some embodiments, identifying and marking for acceleration portions of the objects comprises identifying and marking (730) for acceleration portions of the objects in accordance with the tiers to which the portions of the objects have been assigned. The above discussion of FIG. 6 provides a detailed description of identifying and marking for write acceleration portions of the objects (e.g., address blocks) in accordance with the tiers to which the portions of the objects are assigned. For example, only the object portions (e.g., address blocks) having nodes 320 within tiers (see FIGS. 3A, 3B) that are at or above a "low-water mark" are identified by acceleration determination module 248 as being qualified for acceleration and are marked for acceleration.

The computer system accelerates (732) the object portions marked for acceleration, by accelerating data access, including either or both accelerating data writes and data reads of the object portions to and from the persistent cache. FIG. 2, for example, shows server system 110 configured to accelerate portions of objects (e.g., address blocks or sub-blocks) marked for acceleration by acceleration determination module 248. The above discussion of FIGS. 5A-5B and 6 provides a detailed description of read and write operations, respectively, performed after marking portions of the objects for acceleration.

Although the terms "first," "second," etc. have been used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used above is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit any claimed invention to the precise forms disclosed. Many modifications and variations are possible in view of the descriptions and examples provided above. The embodiments were chosen and described in order to best explain the principles of the invention and its practical applications, to thereby enable others skilled in the art to best utilize the various embodiments with various modifications as are appropriate to particular uses and requirements.

What is claimed is:

1. A method for accelerating data access, performed by a computer system having one or more processors, memory, a tiered data structure stored in the memory, the tiered data structure comprising a plurality of tiers, and a persistent cache for storing accelerated data, the method comprising:

receiving, at the computer system, data access commands from two or more clients to access data in objects identified by the data access commands;

processing, by the computer system, the data access commands to update access history information for respective object portions of the objects identified by the data access commands from the two or more clients, wherein the processing includes:

in accordance with the access history information, determining usage rates for each of the respective object portions identified by the data access commands, and assigning each of the respective object portions identified by the data access commands to one of the plurality of tiers within the tiered data structure in accordance with a determination that a respective determined usage rate for a respective object portion is within a range of usage rates for a respective tier to which the respective object portion is assigned;

wherein each tier of the plurality of tiers within the tiered data structure stores information identifying object portions assigned to that tier;

automatically identifying and marking for acceleration at least some of the respective object portions identified by the data access commands from the two or more clients in accordance with respective tiers to which the at least some of the respective object portions have been assigned, wherein the automatically identifying and marking are performed collectively for the at least some of the respective object portions identified by the data access commands from the two or more clients; and accelerating data access to the at least some of the respective object portions marked for acceleration, by writing the at least some respective object portions marked for acceleration to the persistent cache;
wherein the persistent cache is shared by the two or more clients.

2. The method of claim 1, wherein the persistent cache comprises non-volatile solid state storage.

3. The method of claim 1, wherein the two or more clients comprise virtual machines executed by the computer system.

4. The method of claim 1, wherein the objects comprise one or more virtual disks.

5. The method of claim 1, wherein the respective object portions comprise respective address blocks or sub-blocks of the objects.

6. The method of claim 5, wherein the access history information includes at least one usage history value for a respective address block and at least one distinct respective usage history value for each sub-block of the respective address block.

7. The method of claim 1, wherein the access history information includes at least one operations count for each respective object portion of a plurality of object portions identified by the data access commands.

8. The method of claim 1, wherein updating the access history information comprises:
incrementing a usage history value for a respective object portion assigned to a respective tier for which recent usage criteria are satisfied; and
decrementing a usage history value for other portions of objects assigned to the respective tier for which recent usage criteria are not satisfied.

9. A computer system, comprising:
one or more processors;
a persistent cache for storing accelerated data;
memory storing a tiered data structure, the tiered data structure comprising a plurality of tiers, and one or more programs for execution by the one or more processors, wherein the one or more programs include instructions that when executed by the one or more processors cause the computer system to:
receive, at the computer system, data access commands from two or more clients to access data in objects identified by the data access commands;
process, by the computer system, the data access commands to update access history information for respective object portions of the objects identified by the data access commands from the two or more clients, wherein the instructions for processing the data access commands include instructions that when executed by the one or more processors cause the computer system to:
in accordance with the access history information, determine usage rates for each of the respective object portions identified by the data access commands, and
assign each of the respective object portions identified by the data access commands to one of the plurality of tiers within the tiered data structure in accordance with a determination that a respective determined usage rate for a respective object portion is within a range of usage rates for a respective tier to which the respective object portion is assigned;
wherein each tier of the plurality of tiers within the tiered data structure stores information identifying object portions assigned to that tier;
automatically identify and mark for acceleration at least some of the respective object portions identified by the data access commands from the two or more clients in accordance with respective tiers to which the at least some of the respective object portions have been assigned, wherein the automatically identifying and marking are performed collectively for the at least some of the respective object portions identified by the data access commands from the two or more clients; and
accelerate data access to the at least some of the respective object portions marked for acceleration, by writing the at least some respective object portions marked for acceleration to the persistent cache;
wherein the persistent cache is shared by the two or more clients.

10. The computer system of claim 9, wherein the two or more clients comprise virtual machines executed by the computer system.

11. The computer system of claim 9, wherein the respective object portions comprise respective address blocks or sub-blocks of the objects.

12. The computer system of claim 11, wherein the access history information includes at least one usage history value for a respective address block and at least one distinct respective usage history value for each sub-block of the respective address block.

13. The computer system of claim 9, wherein the access history information includes at least one operations count for each respective object portion of a plurality of object portions identified by the data access commands.

14. A non-transitory computer readable medium storing one or more programs that when executed by one or more processors of a computer system cause the computer system to:
receive, at the computer system, data access commands from two or more clients to access data in objects identified by the data access commands;
process, by the computer system, the data access commands to update access history information for respective object portions of the objects identified by the data access commands from the two or more clients, wherein causing the computer system to process the data access commands includes causing the computer system to:
in accordance with the access history information, determine usage rates for each of the respective object portions identified by the data access commands, and
assign each of the respective object portions identified by the data access commands to one of the plurality of tiers within the tiered data structure in accordance with a determination that a respective determined usage rate for a respective object portion is within a range of usage rates for a respective tier to which the respective object portion is assigned;
wherein each tier of the plurality of tiers within the tiered data structure stores information identifying object portions assigned to that tier;
automatically identify and mark for acceleration at least some of the respective object portions identified by the data access commands from the two or more clients in accordance with respective tiers to which the at least some of the respective object portions have been assigned, wherein the automatically identifying and marking are performed collectively for the at least some of the respective object portions identified by the data access commands from the two or more clients; and accelerate data access to the at least some of the respective object portions marked for acceleration, by writing the at least some respective object portions marked for acceleration to the persistent cache;

wherein the persistent cache is shared by the two or more clients.

15. The non-transitory computer readable medium of claim 14, wherein the two or more clients comprise virtual machines executed by the computer system.

16. The non-transitory computer readable medium of claim 14, wherein the portions of the objects comprise respective address blocks or sub-blocks of the objects.

17. The non-transitory computer readable medium of claim 16, wherein the access history information includes at least one usage history value for a respective address block and at least one distinct respective usage history value for each sub-block of the respective address block.

18. The non-transitory computer readable medium of claim 14, wherein the access history information includes at least one operations count for each respective object portion of a plurality of object portions identified by the data access commands.

19. The non-transitory computer readable medium of claim 14, wherein:

processing the data access commands to update access history information comprises assigning the portions of the objects identified by the data access commands to tiers in accordance with the data acceleration policy and the access history information; and identifying and marking for acceleration portions of the objects comprises identifying and marking for acceleration portions of the objects in accordance with the tiers to which the portions of the objects have been assigned.

20. The method of claim 1, wherein automatically identifying and marking for acceleration at least some of the respective object portions identified by the data access commands further comprises determining a threshold tier in the tiered data structure, and marking for acceleration object portions assigned to the threshold tier and all tiers higher in the tiered data structure than the threshold tier.

21. The method of claim 20, wherein all object portions assigned to the threshold tier and all tiers higher in the tiered data structure than the threshold tier cumulatively comprise a total number of address blocks that is less than or equal to the storage capacity of the persistent cache.

22. The method of claim 1, further including:

processing a data write command to write an identified object portion, the data write command received from a respective client of the two or more clients, by:

automatically marking for acceleration the identified object portion if the identified object portion is assigned to a tier at or above a threshold tier of the plurality of tiers;

in accordance with a determination that the identified object portion is marked for acceleration, writing the identified object portion to the persistent cache and subsequently or concurrently writing the identified object portion to a secondary storage; and in accordance with a determination that the identified object portion is not marked for acceleration, writing the identified object portion to the secondary storage.

23. The computer system of claim 9, wherein the instructions that when executed by the one or more processors cause the computer system to automatically identify and mark for acceleration portions of the objects identified by the data access commands further comprise instructions that when executed by the one or more processors cause the computer system to determine a threshold tier in the tiered data structure and mark for acceleration object portions assigned to the threshold tier and all tiers higher in the tiered data structure than the threshold tier.

24. The method of claim 1, wherein the at least some of the respective object portions marked for acceleration include only a predefined number of the respective object portions, and the predefined number is determined based on a storage capacity of the persistent cache.

25. The method of claim 1, wherein marking a respective object portion for acceleration includes updating information accessible via the tiered data structure to indicate that the respective object portion is marked for acceleration.

* * * * *